(12) United States Patent
Matsui et al.

(10) Patent No.: US 8,031,740 B2
(45) Date of Patent: Oct. 4, 2011

(54) TIME DIVISION MULTIPLE ACCESS COMMUNICATION NETWORK SYSTEM

(75) Inventors: Toshinori Matsui, Chiyoda-ku (JP); Madoka Baba, Chiyoda-ku (JP); Takashi Kaneyama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 12/419,467

(22) Filed: Apr. 7, 2009

(65) Prior Publication Data

US 2010/0091802 A1    Apr. 15, 2010

(30) Foreign Application Priority Data

Oct. 14, 2008    (JP) .................. 2008-265239

(51) Int. Cl.
*H04L 12/43*    (2006.01)
(52) U.S. Cl. ........................ 370/458; 370/498
(58) Field of Classification Search .................. 370/431, 370/442, 443, 464, 498, 503, 216, 225, 228, 370/458, 462, 447
See application file for complete search history.

(56) References Cited

U.S. PATENT DOCUMENTS 3,755,628 A    8/1973   Games et al.
6,707,807 B1 *  3/2004   Menzel ........................ 370/337
2003/0043819 A1 *  3/2003   Jones et al. .................... 370/398
2003/0117995 A1 *  6/2003   Koehn et al. .................. 370/350
2008/0106457 A1 *  5/2008   Bartolini et al. ................ 342/40

FOREIGN PATENT DOCUMENTS

| JP | 09-036903 A | 2/1997 |
| JP | 3908632 B2 | 1/2007 |
| JP | 2008-227890 A | 9/2008 |
| KR | 1997-0008669 B1 | 5/1997 |
| WO | 90/13956 A1 | 11/1990 |

OTHER PUBLICATIONS

German Office Action (Examination Report) corresponding to German Application No. 10-2009-015944.4 dated Jul. 6, 2010, English Translation.

* cited by examiner

*Primary Examiner* — Kwang B Yao
*Assistant Examiner* — Obaidul Huq
(74) *Attorney, Agent, or Firm* — Sughrue Mion, PLLC

(57) ABSTRACT

A transmitter node includes a first data transmission portion that transmits data in a first transmission time slot on a first transmission channel and a second data transmission portion that transmits the same transmission data from the first data transmission portion in a second transmission time slot on a second transmission channel that does not superimpose in time on the first transmission time slot. A receiver node includes a first data reception portion that receives data transmitted from the transmitter node in a first reception time slot superimposing in time on the first transmission time slot on the first transmission channel and a second data reception portion that receives transmission data transmitted from the second data transmission portion in a second reception time slot on the second transmission channel superimposing in time on the second transmission time slot. Data transmission and reception can be thus ensured even at a trouble.

12 Claims, 13 Drawing Sheets

US 8,031,740 B2

TIME DIVISION MULTIPLE ACCESS COMMUNICATION NETWORK SYSTEM

BACKGROUND OF THE INVENTION

1. Field of the Invention

In a case where a time division multiple access communication network system via a plurality of transmission channels is used in a limited space, such as inside an automobile or a ship, the respective transmission channels are installed in the same place. A trouble (for example, damage on communication data resulting from the occurrence of a noise) is therefore highly likely to occur on a plurality of the transmission channels in the same place at the same time.

The present invention relates to a method for ensuring transmission and reception of data in a time division multiple access communication network system via a plurality of transmission channels under any circumstance.

2. Description of the Related Art

FIG. 11 is a view showing the configuration of a line switching system (network system) in the related art described in Japanese Patent No. 3908632 (Patent Document 1).

In the configuration of FIG. 11, the network system includes a plurality of communication nodes, all of which are interconnected via a duplex transmission channel: an active line and a spare line.

The term, communication nodes (also referred to simply as nodes), collectively means terminal devices and switching devices, which are components of the communication network.

In the line switching system (network system) of this configuration, each communication node normally transmits and receives data using the active line alone.

Upon detection of the occurrence of a trouble on the active line, a duplex switching device representing a line switching device continues communications by switching the transmission channel to the spare line.

As has been described, according to the line switching system (network system) in the related art shown in FIG. 11, even when communications are disabled due to the occurrence of a trouble on one of the transmission channels, it is possible for the transmission data to reach a receiver node via the other transmission channel by transmitting the data using a duplex transmission channel. Influences of the trouble to the overall network can be therefore lessened.

As another method, there is a method employed in a network shown in FIG. 12 and FIG. 13 in which communication nodes are interconnected in a ring shape via a plurality of transmission channels (for example, a duplex transmission channel).

FIG. 12 is a view showing the block configuration of each communication node of JP-A-9-36903 (Patent Document 2).

FIG. 13 is a view showing the configuration of a network of JP-A-9-36903 (Patent Document 2) in which communication nodes are interconnected in a ring shape.

The network includes a plurality of communication nodes, which are interconnected via a duplex transmission channel: a 0-system transmission channel and a 1-system transmission channel.

According to the ring-shaped network of this configuration, the respective communication nodes concurrently transmit the same data to the 0-system transmission channel and the 1-system transmission channel in the opposite directions at a time.

According to Patent Document 2, by transmitting the data in the manner described above, even when communications are disabled due to the occurrence of a trouble on one of the transmission channels (for example, the 0-system transmission channel), it is possible for the data to reach a receiver node by transmitting the data via the other transmission channel (for example, the 1-system transmission channel). Influences of the trouble can be therefore eliminated.

By employing the communication method in the ring-shaped network as described above in a bus-type network, which is a non-ring-shaped network shown in FIG. 14, it is readily anticipated that in a case where a trouble occurs on one transmission line, influences of the trouble can be eliminated by using data on the other transmission line that is being transmitted at the same time.

Herein, rings shown in FIG. 14 represent ring-type networks.

However, in order to transmit data via a duplex transmission channel using the method of Patent Document 1, transmission channels are switched after the detection of a trouble on one transmission line. Accordingly, the data being transmitted at the time of trouble detection fails to reach a receiver node because of the switching.

Meanwhile, in order to transmit data over the bus-type network via a duplex transmission channel using the method of Patent Document 2, a noise is generated on the both transmission channels in the same place. Moreover, the transmission data fails to reach a receiver node at the occurrence of a trouble, such as damage on the communication data.

SUMMARY OF THE INVENTION

The invention was devised to solve the problems discussed above and has an object to provide a time division multiple access communication network system that ensures reception of data transmitted from a transmitter node at a receiver node when data is transmitted using a plurality of transmission channels (for example, a duplex transmission channel) even in a case where a trouble occurs on one transmission channel or a trouble occurs on a plurality of the transmission channels in the same place.

A time division multiple access communication network system according to one aspect of the invention is a time division multiple access communication network system in which a plurality of nodes each furnished with a communication capability are interconnected via a plurality of transmission channels, time slots of a same length are present on the plurality of transmission channels, the time slots used for data transmission and reception by the nodes are set in advance on each transmission channel, and the data transmission and reception among the nodes are performed by repeating a time segment, which is a set of the time slots, in a cycle common in the plurality of transmission channels. A transmitter node configured to transmit data includes a first data transmission portion having a first transmission time slot used to transmit at least one item of data within the time segment in one cycle on each transmission channel and configured to transmit the data in the first transmission time slot on a first transmission channel, and a second data transmission portion configured to transmit data same as transmission data transmitted from the first data transmission portion in a second transmission time slot determined in advance on a second transmission channel so as not to superimpose in time on the first transmission time slot. A receiver node configured to receive the data includes a first data reception portion having a reception time slot used to receive at least one item of data within the time segment in one cycle on each transmission channel and configured to receive the data transmitted from the transmitter node in a first reception time slot determined in advance so as to superimpose in time on the first transmission time slot on the first transmission channel, and a second data reception portion configured to receive the transmission data transmitted from the second data transmission portion in a second reception time slot determined in advance on the second transmission channel so as to superimpose in time on the second transmission time slot.

Hence, according to the time division multiple access communication network system of the invention, when data is transmitted on one transmission channel, it is possible to transmit the same data also on another transmission channel in a different transmission time slot. Consequently, in a case where the transmission data is damaged by a temporal trouble on one transmission channel, the receiver node is able to receive the same transmission data intact in a reliable manner on a transmission channel other than the transmission channel on which the data has been damaged by the trouble.

In addition, when the data is transmitted on one transmission channel, it is possible to transmit the same data also on another transmission channel in a different transmission time slot. Consequently, in a case where a temporal trouble occurs on a plurality of transmission channels in the same place at the same time, the receiver node is able to receive the same transmission data intact in a reliable manner on a transmission channel other than the transmission channel on which the transmission data has been damaged by the trouble.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
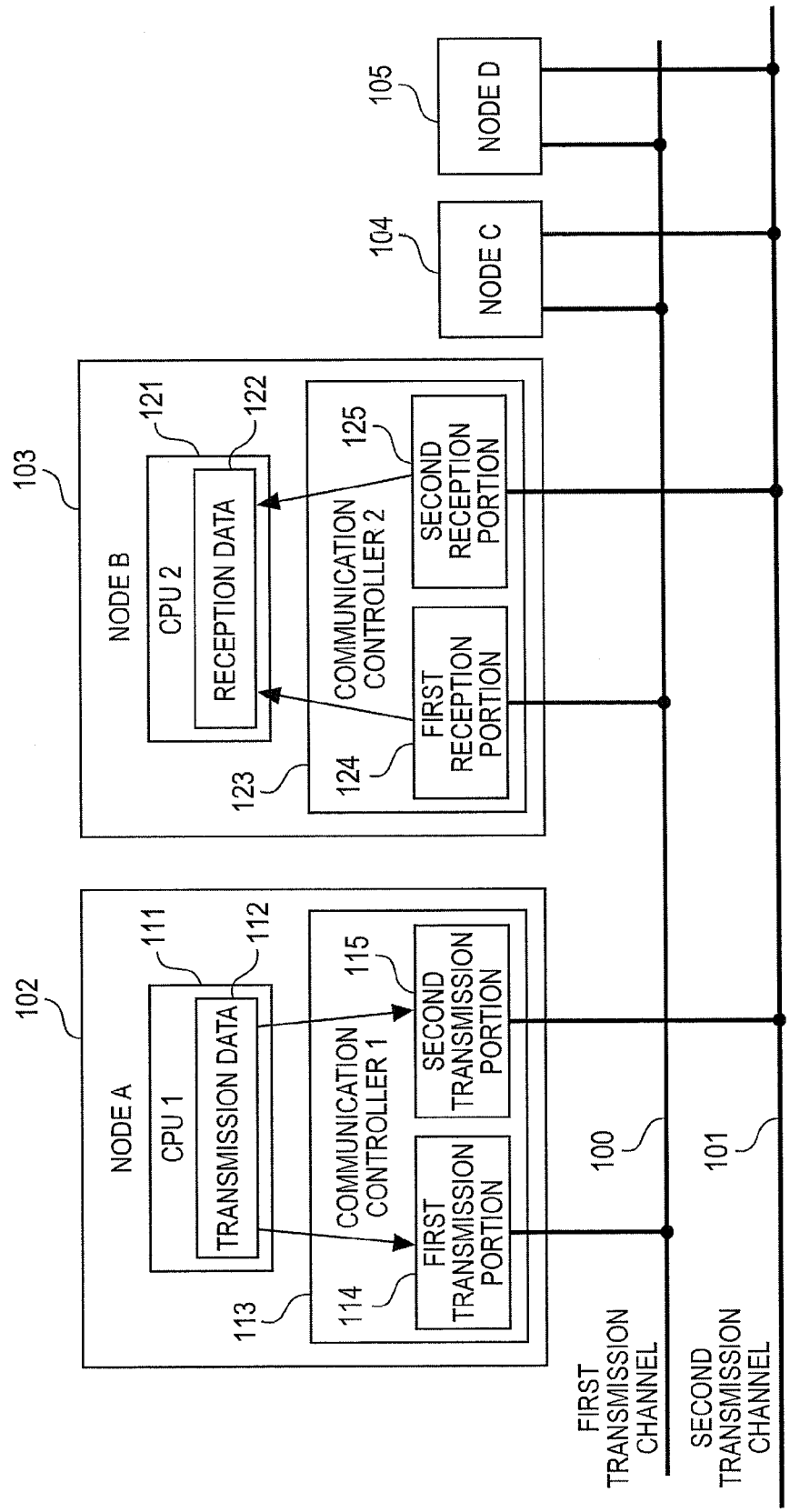
FIG. 1 is view showing the node configuration in a time division multiple access communication network system according to a first embodiment.

Hereinafter, embodiments of the invention will be described with reference to the drawings.

Among the respective drawings, components labeled with the same reference numerals denote the same or equivalent components.

First Embodiment

FIG. 1 shows the node configuration in a time division multiple access communication network system according to a first embodiment.

Referring to the drawing, Numeral 100 denotes a first transmission channel and Numeral 101 denotes a second transmission channel. In this embodiment, assume that these channels are transmission channels employed as a network for time division multiple access for vehicle to make communications in accordance with the FlexRay (registered trademark) communication protocol Ver2.1 rev. A (hereinafter, referred to as the FlexRay communication).

A node A (102), a node B (103), a node C (104), and a node D (105) that make communications are connected to the respective first transmission channel (100) and second transmission channel (101).

The node A (102) that makes communications includes a CPU 1 (111) and a communication controller 1 (113).

The CPU 1 (111) creates transmission data (112) that is transferred to the communication controller 1 (113).

The communication controller 1 (113) is a portion furnished with a communication capability and includes a first transmission portion (114) configured to transmit data to the first transmission channel (100) and a second transmission portion (115) configured to transmit data to the second transmission channel (101).

Herein, the CPU 1 (111) and the communication controller 1 (113) are described as separate components. It is, however, possible to furnish the CPU 1 with the capability of functioning as a communication controller.

Besides the components described above, there are components necessary for the FlexRay communication. These components, however, are not directly involved with the time division multiple access communication network system described in this embodiment and descriptions thereof are omitted herein.

Numeral 103 denotes the node B that makes communications and includes a CPU 2 (121) and a communication controller 2 (123). The CPU 2 (121) receives reception data (112) from the communication controller 2 (113).

The communication controller 2 (113) is a portion furnished with a communication capability and includes a first reception portion (124) configured to receive data from the first transmission channel (100) and a second reception portion (125) configured to receive data from the second transmission channel (101).

Herein, the CPU 2 (121) and the communication controller 2 (123) are described as separate components. It is, however, possible to furnish the CPU 2 with the capability of functioning as a communication controller.

Besides the components described above, there are components necessary for the FlexRay communication. These components, however, are not directly involved with the time division multiple access communication network system described in this embodiment and descriptions thereof are omitted herein.

In the configuration described herein, the communication controller 1 (113) is provided with the transmission portions alone and the communication controller 2 (123) is provided with the reception portions alone in order to constitute a specialized controller for transmission or reception for ease of description of the capabilities of the invention. The invention, however, is not limited to this configuration and each communication controller is provided with both the transmission and reception portions in practice.

Numeral 104 denotes the node C and Numeral 105 denotes the node D.

Each of the node C (104) and the node D (105) is connected to both the node A (102) and the node B (103) via the first transmission channel (100) and the second transmission channel (101). This configuration, however, is not directly involved with the time division multiple access communication network system described in this embodiment and descriptions thereof are omitted herein.

The time division multiple access communication network system in accordance with the FlexRay communication employed in this embodiment will now be described.

Because the FlexRay communication is a known technique, detailed descriptions irrelevant to the invention are omitted herein.

Figure 2:
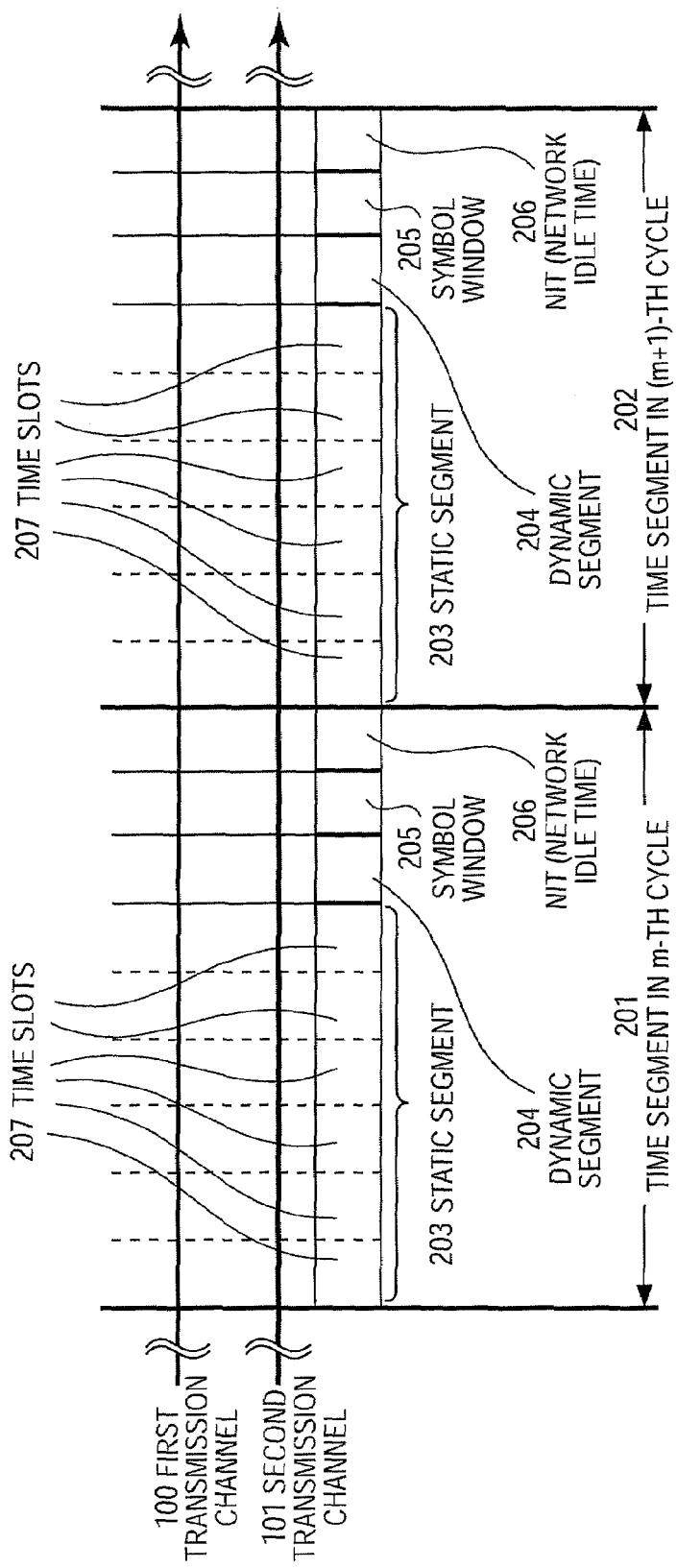
FIG. 2 is a communication configuration view in the FlexRay communication.

FIG. 2 shows the configuration of time segments in the FlexRay communication.

Referring to FIG. 2, Numerals 201 and 202 denote time segments and represent time segments in an m-th cycle and an (m+1)-th cycle, respectively.

Each of the time segment 201 and the time segment 202 is formed of a static segment (203), a dynamic segment (204), a symbol window (205), and a network idle time (206), and a message is transmitted and received by repeating the foregoing in units of time segments.

Hereinafter, the network idle time is abbreviated as NIT.

The static segment (203) is formed of a plurality of time slots (207) of the same length. A plurality of the time slots (207) are set in advance in the corresponding nodes as time slots for performing transmission and reception.

The dynamic segment (204) is capable of transmitting and receiving variable length data at arbitrary timing.

The symbol window (205) and the NIT (206) are portions irrelevant to message transmission and reception and descriptions thereof are omitted herein.

Assume that the communication node performs transmission and reception via two communication channels (that is, transmission channels) under the control of a single communication controller. Then, the static segment (203), the times slots (207) included therein, the dynamic segment (204), the symbol window (205), and the NIT (206) are of a common length and the start times have to be synchronized with each other.

Meanwhile, it is possible to opt not to use the dynamic segment (204) and the symbol window (205) for the FlexRay communication. These components are therefore not used in the time division multiple access communication network system described in this embodiment.

Accordingly, these components are omitted in the network communication configuration views hereinafter.

Figure 3:
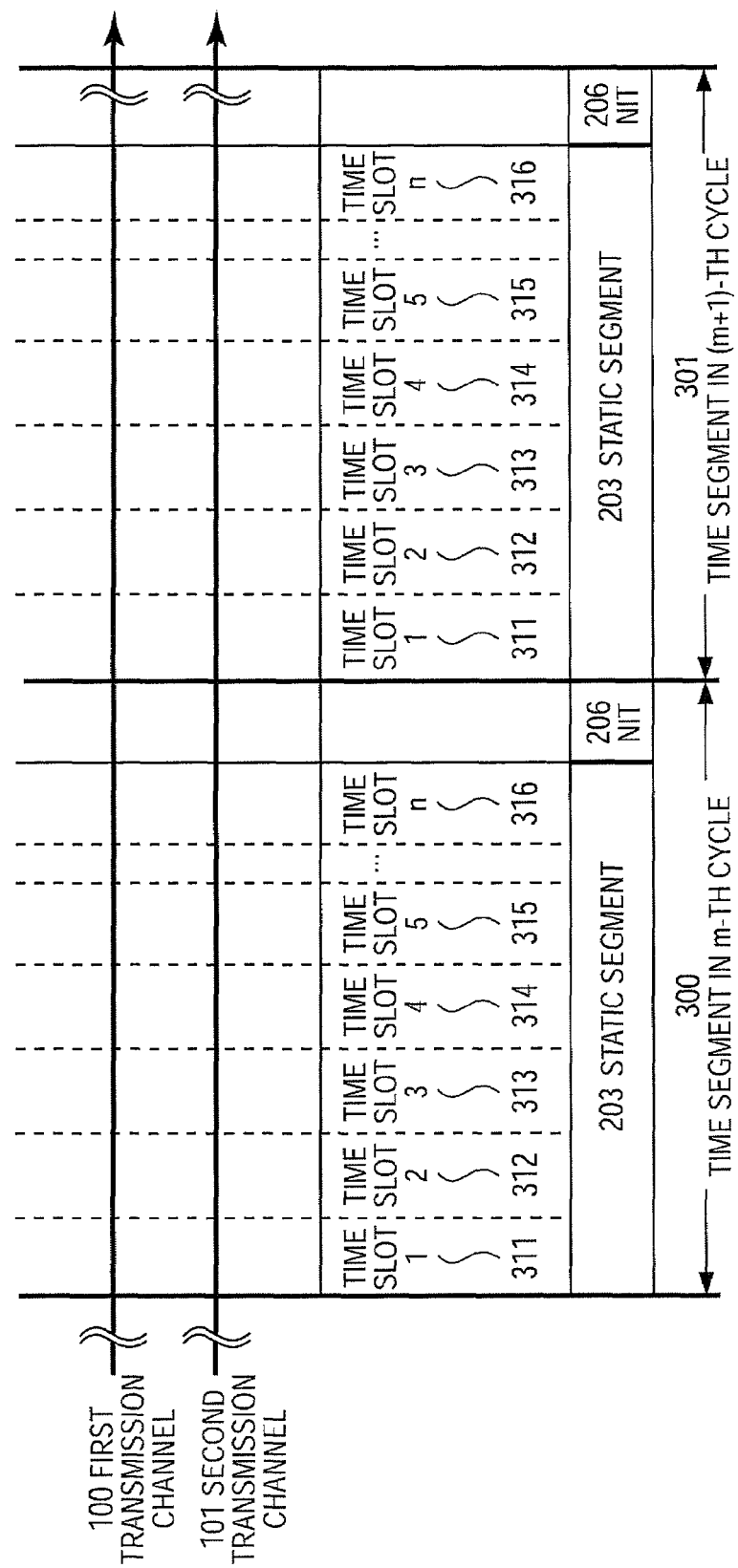
FIG. 3 is a view used to describe the communication configuration in the time division multiple access communication network system of the first embodiment.

FIG. 3 is a view used to describe the communication configuration in the time division multiple access communication network system in accordance with the FlexRay communication.

Referring to FIG. 3, Numerals 300 and 301 denote time segments and each of the time segment (300) and the time segment (301) is formed of a static segment (203) and an NIT (206).

The static segment (203) is formed of a time slot 1 through a time slot n.

Numeral 300 denotes the time segment in an m-th cycle and Numeral 301 denotes the time segment in an (m+1)-th cycle.

These time segments are common in the first transmission channel (100) and the second transmission channel (101).

Numerals 311 through 316 denote a time slot 1 through time slot n, respectively, and each node is enabled to perform reception and transmission in the time slot set in advance therein.

This setting is independent of the cycle number of the time segment and fixed to the figure allocated to the time slot.

It should be noted, however, that data does not have to be transmitted in each cycle in the time slot set for transmission and it is sufficient to transmit data in a cycle interval set in advance as needed. For example, by setting in such a manner so as to transmit data in each cycle in order to shorten the transmission period and to transmit data in every several cycles in order to extend the transmission period, it is possible to adjust the transmission period that suits the importance of data.

By repeating these time segments, periodical transmission and reception are established in the time division multiple access communication network system.

Operations in a normal state of the time division multiple access communication network system via a plurality of transmission channels and having the node configuration shown in FIG. 1 and the communication configuration shown in FIG. 3 will now be described.

Figure 4:
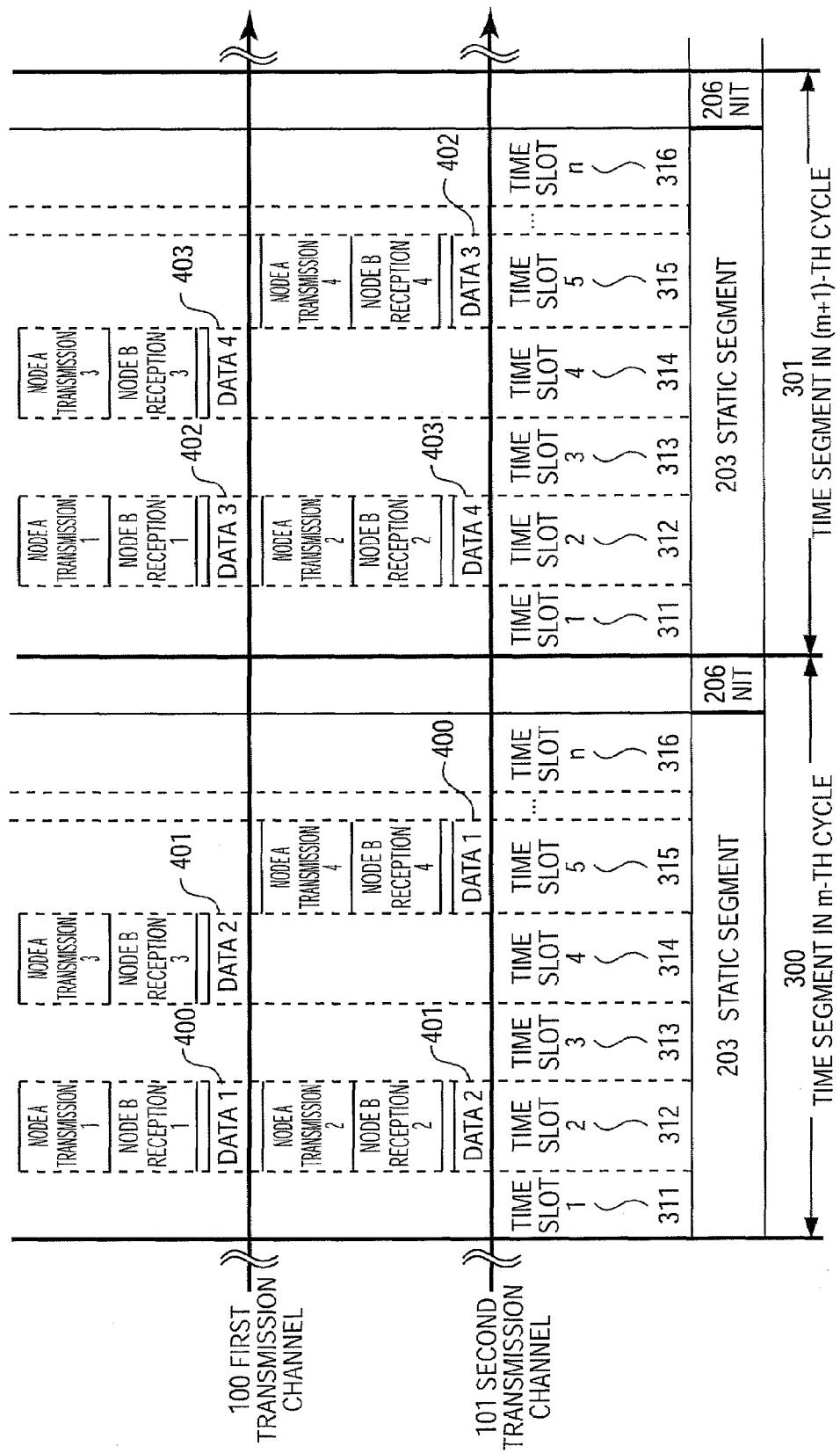
FIG. 4 is a communication configuration view showing the settings of transmission and reception time slots in the time division multiple access communication network system of the first embodiment.

FIG. 4 is a communication configuration view showing the settings of the transmission and reception time slots in the time division multiple access communication network system of this embodiment.

As is shown in FIG. 4, according to the time division multiple access communication network system of this embodiment set in advance in the node A (102) are "transmission 1" in the time slot 2 (312) and "transmission 3" in the time slot 4 (314) on the first transmission channel (100) as well as "transmission 2" in the time slot 2 (312) and "transmission 4" in the time slot 5 (315) on the second transmission channel (101).

Set in advance in the node B (103) are "reception 1" in the time slot 2 (312) and "reception 3" in the time slot 4 (314) on the first transmission channel (100) as well as "reception 2" in the time slot 2 (312) and "reception 4" in the time slot 5 (315) on the second transmission channel (101).

Referring to FIG. 4, Numerals 400 through 403 denote data 1 through 4 to be transmitted and received in the network of this embodiment.

The network to which is applied the invention is configured in such a manner that all the nodes also have a common time and each node is allowed to transmit and receive data only within a predetermined time (time slot) in the common time.

Also, basically, one item of data is allocated to a time slot in which the transmission (within the time segment) is set.

In other words, in order to transmit two types of data (given as data A and data B), it is necessary to set two transmission slots.

"Transmission 1" described above indicates, for example, a time to transmit data A and "transmission 2" indicates a time to transmit data B that is different from the data A.

The data 1 (400) and the data 2 (401) are transmitted within time segment (300) in the m-th cycle, respectively, by "transmission 1" in the time slot 2 (312) and "transmission 3" in the time slot 4 (314) set in the node A (102) on the first transmission channel (100) and received at the node B (103) by "reception 1" and "reception 3", respectively.

Meanwhile, the data 1 (400) and the data 2 (401) are transmitted again within the same time segment (300) in the m-th cycle, respectively, by "transmission 4" in the time slot 5 (315) and "transmission 2" in the time slot 2 (312) set in the node A (102) on the second transmission channel (101) and received again at the node B (103) by "reception 4" and "reception 2", respectively.

In this manner, it is set in advance in such a manner that after the data 1 (400) and the data 2 (401) are transmitted and received separately within the time segment (300) in the m-th cycle, they are transmitted and received again in a different time slot on the second transmission channel (101), which is the other transmission channel, within the same time segment (300).

The same can be said with the data 3 (402) and the data 4 (403). That is to say, it is set in advance in such a manner that after they are transmitted and received in the corresponding transmission time slots on one transmission channel, they are transmitted and received again in different transmission time slots on the other transmission channel within the same time segment.

As normal operations of the network configured as above, the node A (102) transmits the data 1 (400) within the time segment (300) in the m-th cycle by "transmission 1" in the time slot 2 (312) on the first transmission channel (100) and the node B (103) receives the data 1 (400) by "reception 1" in the time slot 2 (312).

Subsequently, the node A (102) transmits the data 2 (401) by "transmission 2" in the time slot 2 (312) on the second transmission channel (101) and the node B (103) receives the data 2 (401) by "reception 2" in the time slot 2 (312).

Herein, the data 2 (401) to be transmitted from the node A (102) by "transmission 2" is the same as the data 2 (401) that will be transmitted by "transmission 3" within the same time segment (300) in the m-th cycle on the first transmission channel (100), which is the other transmission channel.

Further, the node A (102) transmits the data 2 (401) by "transmission 3" in the time slot 4 (314) on the first transmission channel (100) and the node B (103) receives the data 2 (401) by "reception 3" in the time slot 4 (314).

Subsequently, the node A (102) transmits the data 1 (400) by "transmission 4" in the time slot 5 (315) on the second transmission channel (101) and the node B (103) receives the data 1 (400) by "reception 4" in the time slot 5 (315).

Herein, the data 1 (400) to be transmitted from the node A (102) by "transmission 4" is the same as the data 1 (400) that has been transmitted by "transmission 1" within the same time segment (300) in the m-th cycle on the first transmission channel (100), which is the other transmission channel.

Subsequently, within the time segment (301) in the (m+1)-th cycle, the node A (102) transmits the data 3 (402) by "transmission 1" in the time slot 2 (312) on the first transmission channel (100) and the node B (103) receives the data 3 (402) by "reception 1" in the time slot 2 (312).

Subsequently, the node A (102) transmits the data 4 (403) by "transmission 2" in the time slot 2 (312) on the second transmission channel (101) and the node B (103) receives the data 4 (403) by "reception 2" in the time slot 2 (312).

Subsequently, the node A (102) transmits the data 4 (403) by "transmission 3" in the time slot 4 (314) on the first transmission channel (100) and the node B (103) receives the data 4 (403) by "reception 3" in the time slot 4 (314).

Further, the node A (102) transmits the data 3 (402) by "transmission" 4 in the time slot 5 (315) on the second transmission channel (101) and the node B (103) receives the data 4 (402) by "reception 4" in the time slot 5 (315).

Herein, within the time segment (301) in the (m+1)-th cycle, too, the data 4 (403) is the same as the data that will be transmitted in another transmission slot (herein, the transmission data by "transmission 3") within the same time segment on the first transmission channel (100), which is the other transmission channel, and the data 3 (402) is the same as the data that has been transmitted in another transmission time slot (herein, the transmission data by "transmission 1") within the same time segment on the first transmission channel (100), which is the other transmission channel.

While operations for transmission and reception within the time segment (300) in the m-th cycle and the time segment (301) in the (m+1)-th cycle have been described, it should be appreciated that the time segments are performed repetitively and the node A (102) transmits items of data same as all the items of data transmitted on the first transmission channel (100) in different time slots on the second transmission channel (101).

Accordingly, the node B (103) receives items of data same as all the items of data received on the first transmission channel (100) within the same time segment in different time slots on the second transmission channel (101).

The settings of the transmission and reception time slots on each transmission channel and in each node as described above are made before communications are started in common among the nodes connected to the network.

Figure 5:
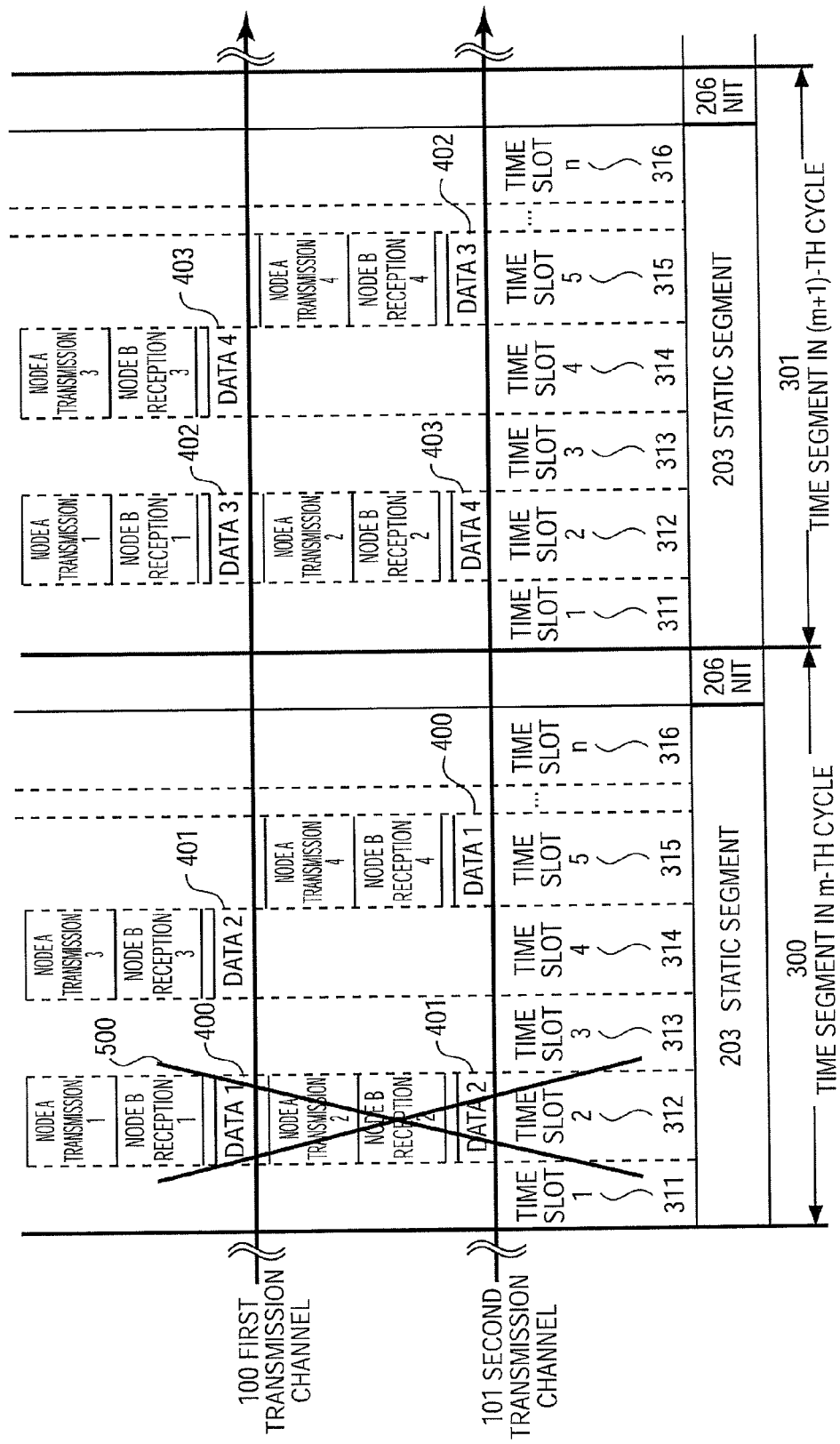
FIG. 5 is a view used to describe operations of the time division multiple access communication network system of the first embodiment at the occurrence of a trouble.

Operations of the time division multiple access communication network system via a plurality of transmission channels of this embodiment in a case where a temporal trouble occurs on a plurality of the transmission channels in the same place at the same time will now be described with reference to FIG. 5.

Assume that a noise is applied as a trouble to the first transmission channel (100) and the second transmission channel (101) in the same place at the same time. Herein, as is shown in FIG. 5, a noise (500) is applied to the time slot 2 (312) within the time segment (300) in the m-th cycle and the data 1 (400) being transmitted on the first transmission channel (100) and the data 2 (401) being transmitted on the second transmission channel (101) are consequently damaged.

In this embodiment, however, regarding the data 1 (400) damaged by the noise (500), the node A (102) transmits the intact data 1 (400) by "transmission 4" in the time slot 5 (315) on the second transmission channel (101) as set in advance. The node B (103) is thus able to receive the data 1 (400) by "reception 4" in the time slot 5 (315).

Likewise, regarding the data 2 (401) damaged by the noise (500), it is possible to transmit the intact data 2 (401) by "transmission 3" in the time slot 5 (315) on the first transmission channel (100) as set in advance, so that the node B (103) is able to receive the data 2 (401) by "reception 3" in the time slot 5 (315).

As has been described, in a case where a temporal trouble occurs on a plurality of transmission channels in the same place at the same time due to influences of noise or the like, it is possible to transmit and receive data same as the intact data before it was damaged on the other transmission channel within the same time segment without having to perform special switching processing after the noise detection.

In addition, in a case where a temporal trouble occurs on a plurality of transmission channels in the same place at the same time due to influences of noise or the like, it is possible to transmit and receive data same as the intact data before it was damaged on the other transmission channel within the same time segment without interrupting any other communication.

Further, the network configuration shown in FIG. 4 is provided with two transmission time slots for the node A (102) and two reception time slots for the node B (103) on the first transmission channel (100) as well as two transmission time slots for the node A (102) and two reception time slots for the node B (103) on the second transmission channel (101). It should be appreciated, however, that the same advantages can be achieved even when more time slots for transmission and reception are provided on each transmission channel by setting in advance in such a manner that different items of data are transmitted and received in the same time slot on the respective transmission channels.

As has been described, a time division multiple access communication network system of this embodiment is a time division multiple access communication network system in which a plurality of nodes (102 through 105) each furnished with a communication capability are interconnected via a plurality of transmission channels (100 and 101), time slots of a same length are present on the plurality of transmission channels, the time slots used for data transmission and reception by the nodes are set in advance on each transmission channel, and the data transmission and reception among the nodes are performed by repeating a time segment, which is a set of the time slots, in a cycle common in the plurality of transmission channels. A transmitter node (102) configured to transmit data includes a first data transmission portion (114) having a first transmission time slot used to transmit at least one item of data within the time segment in one cycle on each transmission channel and configured to transmit the data in the first transmission time slot on a first transmission channel (100), and a second data transmission portion (115) configured to transmit data same as transmission data transmitted from the first data transmission portion (114) in a second transmission time slot determined in advance on a second transmission channel (101) so as not to superimpose in time on the first transmission time slot. A receiver node (103) configured to receive the data includes a first data reception portion (124) having a reception time slot used to receive at least one item of data within the time segment in one cycle on each transmission channel and configured to receive the data transmitted from the transmitter node in a first reception time slot determined in advance so as to superimpose in time on the first transmission time slot on the first transmission channel (100), and a second data reception portion (125) configured to receive the transmission data transmitted from the second data transmission portion (115) in a second reception time slot determined in advance on the second transmission channel (101) so as to superimpose in time on the second transmission time slot.

Hence, according to the time division multiple access communication network system of this embodiment, when data is transmitted on one transmission channel, it is possible to transmit the same data also on another transmission channel in a different transmission time slot. Consequently, in a case where the transmission data is damaged by a temporal trouble on one transmission channel, the receiver node is able to receive the same transmission data intact in a reliable manner on a transmission channel other than the transmission channel on which the data has been damaged by the trouble.

In addition, when the data is transmitted on one transmission channel, it is possible to transmit the same data also on another transmission channel in a different transmission time slot. Consequently, in a case where a temporal trouble occurs on a plurality of transmission channels in the same place at the same time, the receiver node is able to receive the same transmission data intact in a reliable manner on a transmission channel other than the transmission channel on which the transmission data has been damaged by the trouble.

Also, the second transmission time slot determined from the transmission time slots on the second transmission channel within a time segment in a cycle same as the cycle of the first transmission time slot on the first transmission channel is set in advance in the transmitter node.

Hence, when the data is transmitted on one transmission channel, it is possible to transmit the same data also on another transmission channel in a transmission slot that differs from one transmission channel to another within the time segment in the same cycle. Consequently, in a case where a temporal trouble occurs on a plurality of transmission channels in the same place at the same time, the receiver node is able to receive the same transmission data intact in a reliable manner within the predetermined time segment on a transmission channel other than the transmission channel on which the data has been damaged by the trouble.

Also, the first transmission time slot on the first transmission channel and the second transmission time slot on the second transmission channel are set in advance in the transmitter node for all items of the transmission data.

Hence, regarding all the items of data transmitted on one transmission channel, it is possible to transmit the same items of data also on another transmission channels in different corresponding transmission time slots. Consequently, in a case where a temporal trouble occurs on a plurality of transmission channels in the same place at the same time, the receiver node is able to receive the same transmission data intact in a reliable manner on a transmission channel other than the transmission channel on which the transmission data has been damaged by the trouble.

Second Embodiment

Figure 6:
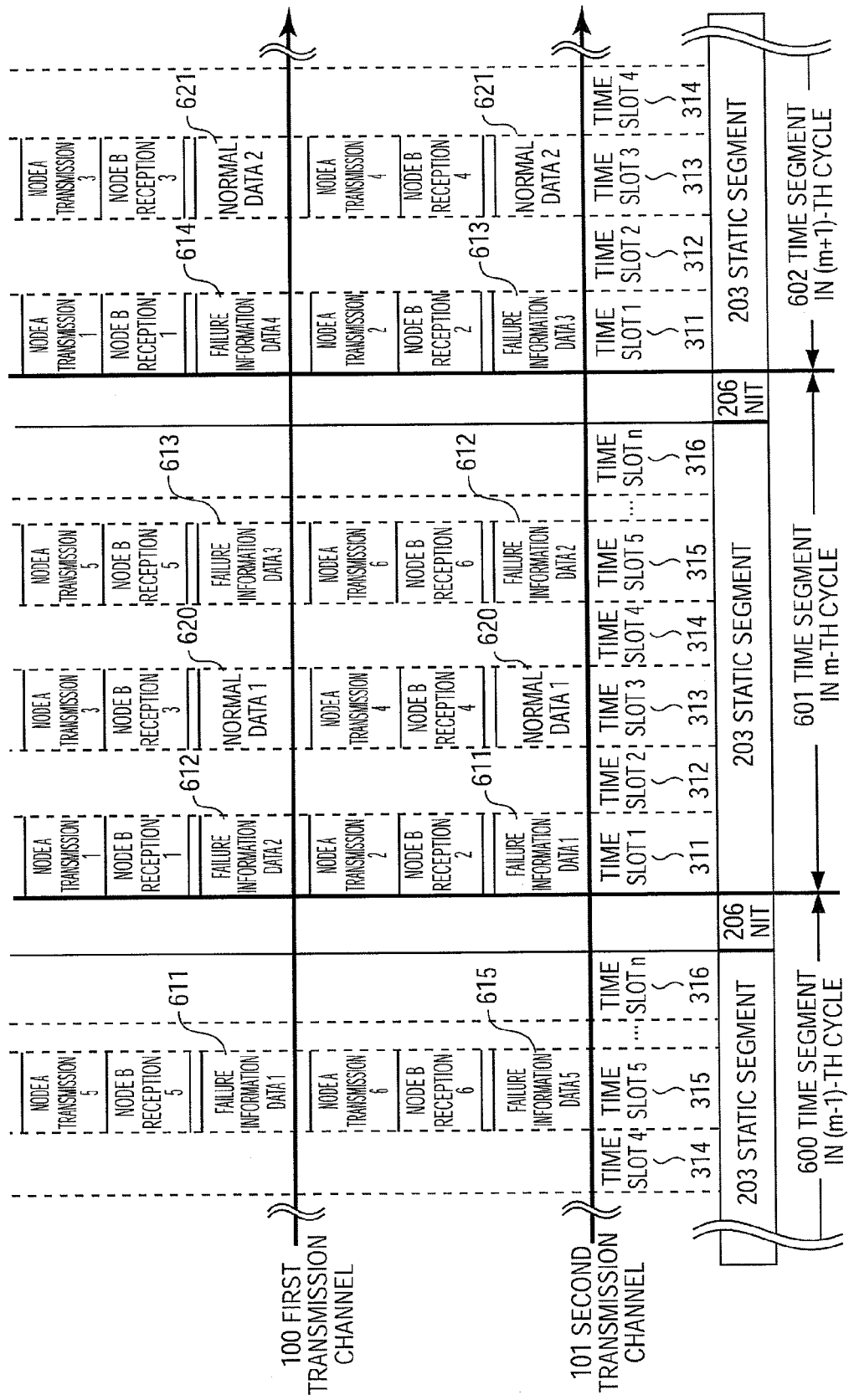
FIG. 6 is a communication configuration view showing the settings of transmission and reception time slots in a time division multiple access communication network system according to a second embodiment.

FIG. 6 is a communication configuration view showing the settings of transmission and reception time slots in a time division multiple access communication network system according to a second embodiment.

Because the node configuration in the time division multiple access communication network system of this embodiment is the same as the node configuration of the first embodiment shown in FIG. 1, descriptions thereof are omitted herein.

The communication configuration in the time division multiple access communication network system of this embodiment in accordance with the FlexRay communication will now be described with reference to FIG. 6.

Referring to FIG. 6, Numerals 600 through 602 denote time segments and each is formed of a static segment (203) and an NIT (206).

The static segment (203) is formed of a time slot 1 through a time slot n.

Numeral 600 denotes a time segment in an (m−1)-th cycle. Numeral 601 denotes a time segment in an m-th cycle. Numeral 602 denotes a time segment in an (m+1)-th cycle.

These segments are common in the first transmission channel (100) and the second transmission channel (101).

In the configuration as above, set in advance in the node A (102) are "transmission 1" in the time slot 1 (311), "transmission 3" in the time slot 3 (313), and "transmission 5" in the time slot 5 (315) on the first transmission channel (100) as well as "transmission 2" in the time slot 1 (311), "transmission 4" in the time slot 3 (313), and "transmission 6" in the time slot 5 (315) on the second transmission channel (101).

Also, set in advance in the node B (103) are "reception 1" in the time slot 1 (311), "reception 3" in the time slot 3 (313), and "reception 5" in the time slot 5 (315) on the first transmission channel (100) as well as "reception 2" in the time slot 1 (311), "reception 4" in the time slot 3 (313), and "reception 6" in the time slot 5 (315) on the second transmission channel (101).

Numerals 611 through 615 denote failure information data (including trouble information), which is crucial and indicates a trouble in a node for performing transmission and reception in the network of this embodiment.

Now, in the following description, "failure information data" shall include "trouble information".

The failure information date 1 (611) is transmitted within the time segment (600) in the (m−1)-th cycle by "transmission 5" in the time slot 5 (315) set in the node A (102) on the first transmission channel (100) and received at the node B (102) by "reception 5" in the time slot 5 (315).

Meanwhile, the failure information data 1 (611) is transmitted again by "transmission 2" in the time slot 1 (311) set in the node A (102) on the second transmission channel (101) within the time segment (601) in the m-th cycle, which is the next transmission time slot, and received again at the node B (102) by "reception 2".

In this manner, it is set in advance in such a manner that after the failure information data 1 (611) is transmitted and received on the first transmission channel (100), the failure information data 1 (611) is transmitted and received again in the next transmission and reception time slot on the second transmission channel (101), which is the other transmission channel.

The same can be said with the failure information data 2 (612), the failure information data 3 (613), the failure information data 4 (614), and the failure information data 5 (615). That is to say, it is set in advance in such a manner that after they are transmitted and received in the corresponding transmission and reception time slots on the first transmission channel (100), they are transmitted and received also in the next transmission and reception time slots on the second transmission channel (101), which is the other transmission channel.

Although it is not shown in the drawing, after the failure information data 4 (614) is transmitted and received by "transmission 1" and "reception 1" in the time slot 1 (311) on the first transmission channel (100), it is transmitted and received in the next transmission and reception time slot on the second transmission channel (101).

In addition, although it is not shown in the drawing, either, after the failure information data 5 (615) is transmitted and received in the transmission and reception time slot on the first transmission channel (100), it is transmitted and received by "transmission 6" and "reception 6" in the time slot 5 (315) on the second transmission channel (101), which is the next transmission and reception time slot on another transmission channel.

Meanwhile, Numerals 620 and 621 denote normal data to be transmitted and received in the network of this embodiment.

The normal data 1 (620) is transmitted within the time segment (601) in the m-th cycle from the node A (102) by "transmission 3" in the time slot 3 (313) on the first transmission channel (100) and by "transmission 4" in the time slot 3 (313) on the second transmission channel (101) and received at the node B (102) by "reception 3" on the first transmission channel (100) and by "reception 4" on the second transmission channel (101).

Also, the normal data 2 (621) is transmitted within the time segment (602) in the (m+1)-th cycle from the node A (102) by "transmission 3" in the time slot 3 (313) on the first transmission channel (100) and by "transmission 4" in the time slot 3 (313) on the second transmission channel (101) and received at the node B (102) by "reception 3" on the first transmission channel (100) and by "reception 4" on the second transmission channel (101).

In this manner, regarding the normal data, it is set in advance in such a manner that the same data is transmitted on the first transmission channel (100) and the second transmission channel (101).

As normal operations in the network configured as above, the node A (102) transmits the failure information data 2 (612) within the time segment (601) in the m-th cycle by "transmission 1" in the time slot 1 (311) on the first transmission channel (100) and the node B (103) receives the failure information data 2 (612) by "reception 1" in the time slot 1 (311).

Subsequently, the node A (102) transmits the failure information data 1 (611) by "transmission 2" in the time slot 1 (311) on the second transmission channel (101) and the node B (103) receives the failure information data 1 (611) by "reception 2" in the time slot 1 (311).

It should be noted that the failure information data to be transmitted from the node A (102) by "transmission 2" is the same as the failure information data 1 (611) that has been transmitted by "transmission 5", which is the time slot (herein, the time slot 5 (315) within the time segment (600) in the (m−1)-th cycle) in which the next preceding failure information data was transmitted on the first transmission channel (100), which is the other transmission channel.

Further, the node A (102) transmits the normal data 1 (620) by "transmission 3" in the time slot 3 (313) on the first transmission channel (100) and the node B (103) receives the normal data 1 (620) by "reception 3" in the time slot 3 (313).

Subsequently, the node A (102) transmits the same normal data 1 (620) by "transmission 4" in the time slot 3 (313) on the second transmission channel (101) and the node B (103) receives the normal data 1 (620) by "reception 4" in the time slot 3 (313).

Further, the node A (102) transmits the failure information data 3 (613) by "transmission 5" in the time slot 5 (315) on the first transmission channel (100) and the node B (103) receives the failure information data 3 (613) by "reception 5" in the time slot 5 (315).

Subsequently, the node A (102) transmits the failure information data 2 (612) by "transmission 6" in the time slot 5 (315) on the second transmission channel (101) and the node B (103) receives the failure information data 2 (612) by "reception 6" in the time slot 5 (315).

Herein, it should be noted that the failure information data to be transmitted from the node A (102) by "transmission 6" is the same as the failure information data 2 (612) that has been transmitted by "transmission 1" in the time slot (herein, the time slot 1 (311) within the time segment (601) in the m-th cycle) in which the next preceding failure information data was transmitted on the first transmission channel (100), which is the other transmission channel.

While transmission and reception operations within the time segment (601) in the m-th cycle alone have been described, it should be appreciated that regarding the failure information data, the node A (102) transmits the failure information same as the failure information data that has been transmitted on the first transmission channel (100) on the second transmission channel (101) in a next or later transmission time slot in which to transmit the failure information data, whereas regarding the normal data, it always transmits the same data on the first transmission channel (100) and the second transmission channel (101) within the time segment (602) in the (m+1)-th cycle or later in the same manner as above.

Meanwhile, regarding the failure information data, the node B (103) receives items of the failure information data same as all the items of the failure information data received on the first transmission channel (100) also in a next or later reception time slot in which to receive the failure information data on the second transmission channel (101), whereas regarding the normal data, it always receives the same data on the first transmission channel (100) and the second transmission channel (101).

The settings of the transmission and reception time slots on each transmission channel and in each node are made in advance before communications are started in common among the nodes connected to the network.

Operations of the time division multiple access communication network system of this embodiment at the occurrence of a temporal trouble on a plurality of transmission channels in the same place at the same time will now be described with reference to FIG. 7.

Assume that a noise is applied to the first transmission channel (100) and the second transmission channel (101) in the same place at the same time.

Figure 7:
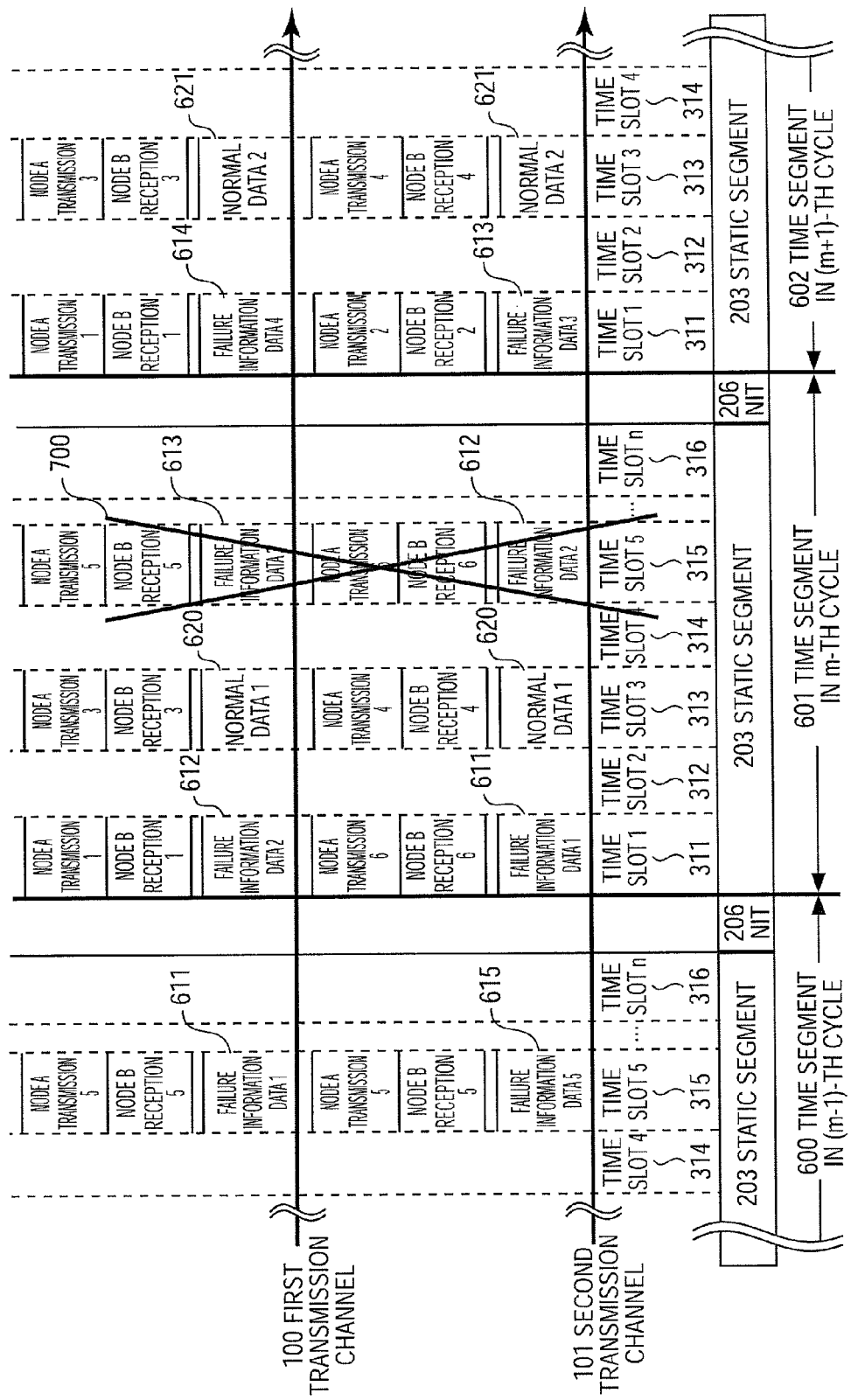
FIG. 7 is a view used to describe operations of the time division multiple access communication network system of the second embodiment at the occurrence of a trouble.

Herein, as is shown in FIG. 7, assume that a noise (700) is applied as a trouble to the time slot 5 (315) within the time segment (601) in the m-th cycle and the failure information data 3 (613) being transmitted on the first transmission channel (100) and the failure information data 2 (612) being transmitted on the second transmission channel (101) are consequently damaged.

In this embodiment, however, it is set in advance in such a manner that the failure information data 3 (613), which was supposed to be transmitted and received by "transmission 5" and "reception 5" in the time slot 5 (315) on the first transmission channel (100) and is now damaged by the noise (700), is transmitted intact from the node A (102) by "transmission 2" in the time slot 1 (311) within the time segment (602) in the (m+1)-th cycle, which is the next transmission time segment for failure information data on the second transmission channel (101). The node B (103) is thus able to receive the failure information data 3 (613) by "reception 2" within the time segment (602) in the (m+1)-th cycle.

Meanwhile, regarding the failure information data 2 (612) that has been damaged by the noise (700), it had been already transmitted from the node A (102) by "transmission 1" in the time slot 1 (311) within the time segment (601) in the m-th cycle, which is the same time segment on the first transmission channel (100), and had been already received at the node B (103) by "reception 1" in the time slot 1 (311). The failure information data 2 (612) is thus unsusceptible to data damage by the noise (700).

As has been described, in a case where crucial data, such as failure information data, is damaged at the occurrence of a temporal trouble caused by a noise or the like on a plurality of transmission channels in the same place at the same time, it is possible to transmit and receive the intact crucial data in time slots in which the next preceding and following transmission and reception are set on the other transmission channel without having to perform special switching or the like after the noise detection.

In addition, in a case where crucial data, such as failure information, is damaged at the occurrence of a temporal trouble caused by a noise or the like on a plurality of transmission channels in the same place at the same time, it is possible to transmit and receive the intact crucial data in time slots in which the next preceding and following transmission and reception are set on the other transmission channel without interrupting any other communication.

By defining the failure information data as crucial data as in this embodiment, no data relevant to the failure information will be dropped even at the occurrence of a temporal trouble. Information is thus received continuously at the receiver's end as useful materials to find out the cause of the trouble in detail.

The criteria to select the crucial data may be a short data transmission period or a long data transmission period.

Regarding the data having a short data transmission period, when the data is damaged at the occurrence of a temporal trouble, it is highly likely that the content of the data has been changed considerably when the data is received next.

Hence, unintended dropping of the data can cause noticeable influences when the application installed in the node performs the processing that requires an amount of data that has been changed. In view of the foregoing, the capability of the invention to ensure the reception of data having a short data transmission period provides significant advantages.

Also, regarding data having a long data transmission period, when the data is damaged at the occurrence of a temporal trouble, it takes a time to receive the latest content of the data next time. Hence, unintended dropping of the data can extend a time during which the content of the data remains uncertain and cause noticeable influences to processing by the application installed in the node.

In view of the foregoing, the capability of the invention to ensure the reception of data having a long data transmission period provides significant advantages.

Further, the same advantages can be achieved by selecting the crucial data according to the system used or the application installed in the node, or by selecting all the data as the crucial data.

Furthermore, the network configuration in FIG. 6 is provided with three transmission time slots for the node A (102) and three reception time slots for the node B (103) on the first transmission channel (100) as well as three transmission time slots for the node A (102) and three reception time slots for the node B (103) on the second transmission channel (101). It should be appreciated, however, that the same advantages can be achieved even when more time slots for transmission and reception are provided on each transmission channel by configuring in such a manner so as not to transmit and receive the same data on a plurality of transmission channels at the same time by shifting the time slot for transmission and reception by one slot or more on each transmission channel.

This embodiment is configured so as not to transmit and receive the same data on the respective transmission channels in the same time slot by shifting the transmission and reception processing on the second transmission channel (101) by one processing with respect to the first transmission channel (100) However, there is a case where the same data is transmitted and received in the same time slot on the first transmission channel (100) and the second transmission channel (101) merely by shifting the transmission and reception by one processing depending on a manner in which the transmission and reception processing is set.

It is therefore necessary to adjust a shifting amount of transmission processing in order to set in advance in such a manner that the same crucial data will not be transmitted and received in the same time slot.

As has been described, the time division multiple access communication network system of this embodiment is characterized in that, in the first embodiment above, a transmission time slot on the second transmission channel (101) to be transmitted next or later the first transmission time slot on the first transmission channel (100) is set in advance in the transmitter node as the second transmission time slot.

Hence, according to this embodiment, when data is transmitted on one transmission channel, it is possible to transmit the same data also on another transmission channel by shifting the transmission time slot by one slot or more on each transmission channel. Consequently, even in a case where a temporal trouble occurs on a plurality of transmission channels in the same place at the same time, the receiver node is able to receive the same transmission data intact immediately in a reliable manner in the preceding and following time slots on a transmission channel other than the transmission channel on which the data has been damaged by the trouble.

Also, according to this embodiment, the first transmission time slot on the first transmission channel and the second transmission time slot on the second transmission channel are set in advance in the transmitter node for transmission of data having a short transmission period.

Hence, regarding data having a short transmission period transmitted on one transmission channel, it is possible to transmit the same data also on another transmission channel in a different transmission time slot. Consequently, even in a case where a temporal trouble occurs on a plurality of transmission channels in the same place at the same time, the receiver node is able to receive the intact crucial transmission data having a short data transmission period in a reliable manner on a transmission channel other than the transmission channel on which the transmission data has been damaged by the trouble.

Also, according to this embodiment, the first transmission time slot on the first transmission channel and the second transmission time slot on the second transmission channel are set in advance in the transmitter node for transmission of data having a long transmission period.

Hence, regarding data having a long data transmission period transmitted on one transmission channel, it is possible to transmit the same data also on another transmission channel in a different transmission time slot. Consequently, even in a case where a temporal trouble occurs on a plurality of transmission channels in the same place at the same time, the receiver node is able to receive the crucial transmission data, which has a long data transmission period and thereby takes a time until it is received next once a failure occurs in reception, in a reliable manner on a transmission channel other than the transmission channel on which the transmission data has been damaged by the trouble.

Also, according to this embodiment, the first transmission time slot on the first transmission channel and the second transmission time slot on the second transmission channel are set in advance in the transmitter node for transmission of data relevant to a failure of its own.

Hence, regarding data relevant to failure information transmitted on one transmission channel, it is possible to transmit the same data also on another transmission channel in a different transmission time slot. Consequently, even in a case where a temporal trouble occurs on a plurality of transmission channels in the same place at the same time, the receiver node is able to receive the crucial transmission data relevant to failure information in a reliable manner on a transmission channel other than the transmission channel on which the transmission data has been damaged by the trouble.

Third Embodiment

Figure 8:
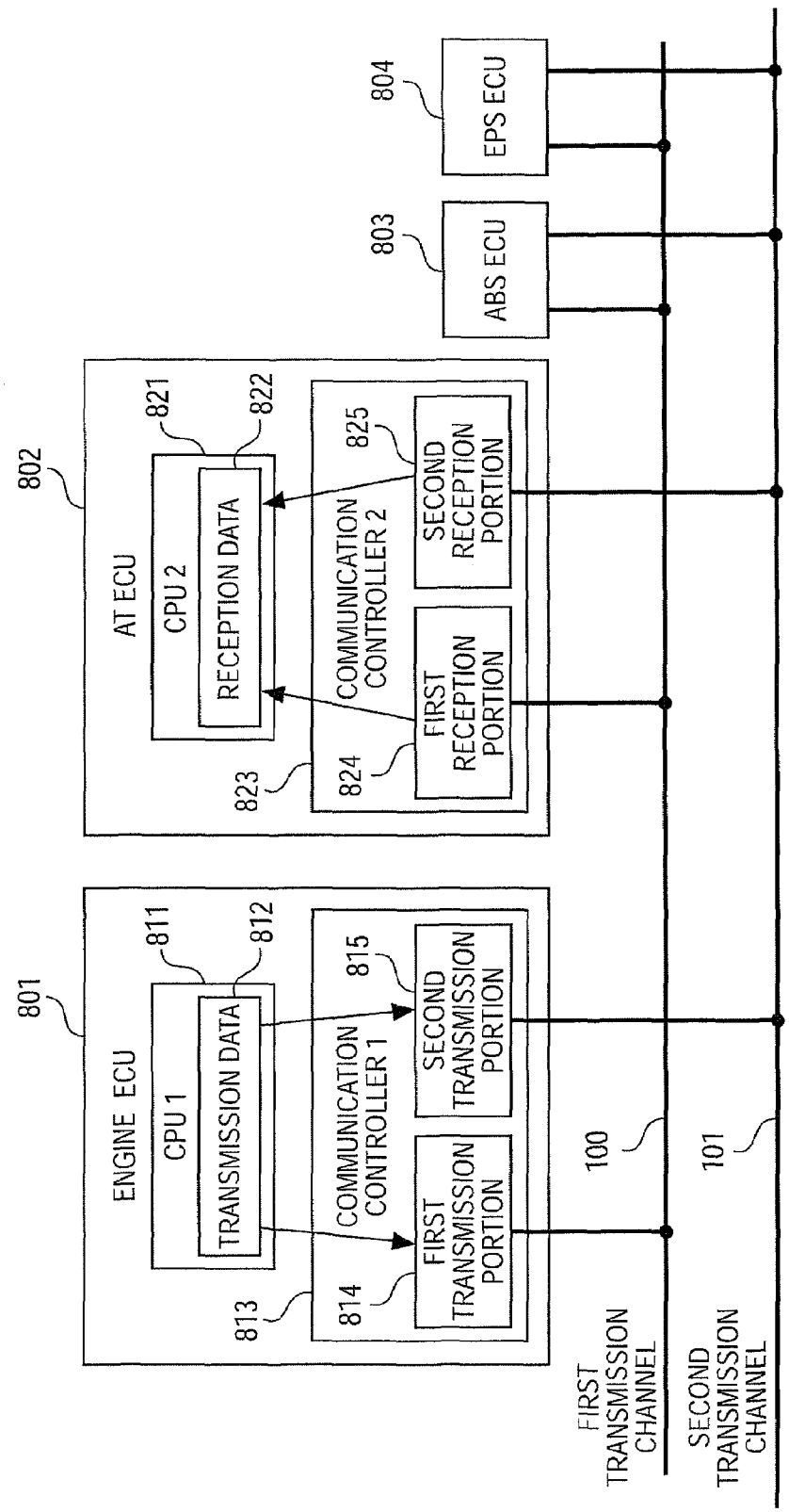
FIG. 8 is a view showing the node configuration in a time division multiple access communication network system according to a third embodiment.

FIG. 8 shows the node configuration in a time division multiple access communication network system according to a third embodiment.

Referring to the drawing, Numerals 100 and 101 denote a first transmission channel and a second transmission channel, respectively, both of which are provided inside a vehicle.

In this embodiment, assume that the first transmission channel (100) and the second transmission channel (101) are transmission channels employed as a network for time division multiple access for vehicle to perform the FlexRay communication.

Connected to each of the first transmission channel (100) and the second transmission channel (101) as applications for making communications are an engine ECU (801) that performs engine control of the vehicle, an AT ECU (802) that controls AT (Automatic Transmission), an ABS ECU (803) that controls an ABS (Anti-lock Brake System), and an EPS ECU (804) that controls an EPS (Electric Power Steering), each of which is a communication node.

Numeral 801 denotes the engine ECU (Electric Control Unit) and makes communications with other ECU's via transmission channels. The engine ECU (801) includes a CPU 1 (811) and a communication controller 1 (813).

The CPU 1 (811) creates transmission data (812) that is transferred to the communication controller 1 (813).

The communication controller 1 (813) is a portion furnished with a communication capability and includes a first transmission portion (814) configured to transmit data to the first transmission channel (100) and a second transmission portion (815) configured to transmit data to the second transmission channel (101).

The CPU 1 (811) and the communication controller 1 (813) are described as separate components. It is, however, possible to furnish the CPU 1 with the capability of functioning as a communication controller.

Besides the components described above, there are components necessary for the FlexRay communication. These components, however, are not directly involved with the time division multiple access communication network system described in this embodiment and descriptions of these components are omitted herein.

Numeral 802 denotes the AT ECU that makes communications and it makes communications with other ECU's via transmission channels.

The AT ECU (802) includes a CPU 2 (821) and a communication controller 2 (823).

The CPU 2 (821) receives reception data (822) from the communication controller 2 (823).

The communication controller 2 (823) is a portion furnished with the communication capability and includes a first reception portion (824) configured to receive data from the first transmission channel (100) and a second reception portion (825) configured to receive data from the second transmission channel (101).

Herein, the CPU 2 (821) and the communication controller 2 (823) are described as separate components. It is, however, possible to furnish the CPU 2 with the capability of functioning as a communication controller.

Besides the components described above, there are components necessary for the FlexRay communication. These components, however, are not directly involved with the time division multiple access communication network system described in this embodiment and descriptions of these components are omitted herein.

In this configuration, the engine ECU (801) and the AT ECU (802) are furnished with communication capabilities alone. It goes without saying that devices as well as inputs and outputs necessary to control the engine and the AT are required. However, because they are not directly involved with the capability of the time division multiple access communication network system described in this embodiment, descriptions thereof are omitted herein.

Further, in this configuration, the communication controller 1 (813) is provided with the transmission portions alone and the communication controller 2 (823) is provided with the reception portions alone in order to constitute a specialized controller for transmission or reception for ease of description of the capabilities of the invention. The invention, however, is not limited to this configuration and each communication controller is provided with both the transmission and reception portions in practice.

Numeral 803 denotes the ABS ECU and Numeral 804 denotes the EPS ECU. Each is connected to both the engine ECU (801) and the AT ECU (802) via the first transmission channel (100) and the second transmission channel (101). These ECU's, however, are not directly involved with the time division multiple access communication network system described in this embodiment and descriptions thereof are omitted herein.

The communication configuration in the time division multiple access communication network system of this embodiment in accordance with the FlexRay communication will now be described with reference to FIG. 9.

Figure 9:
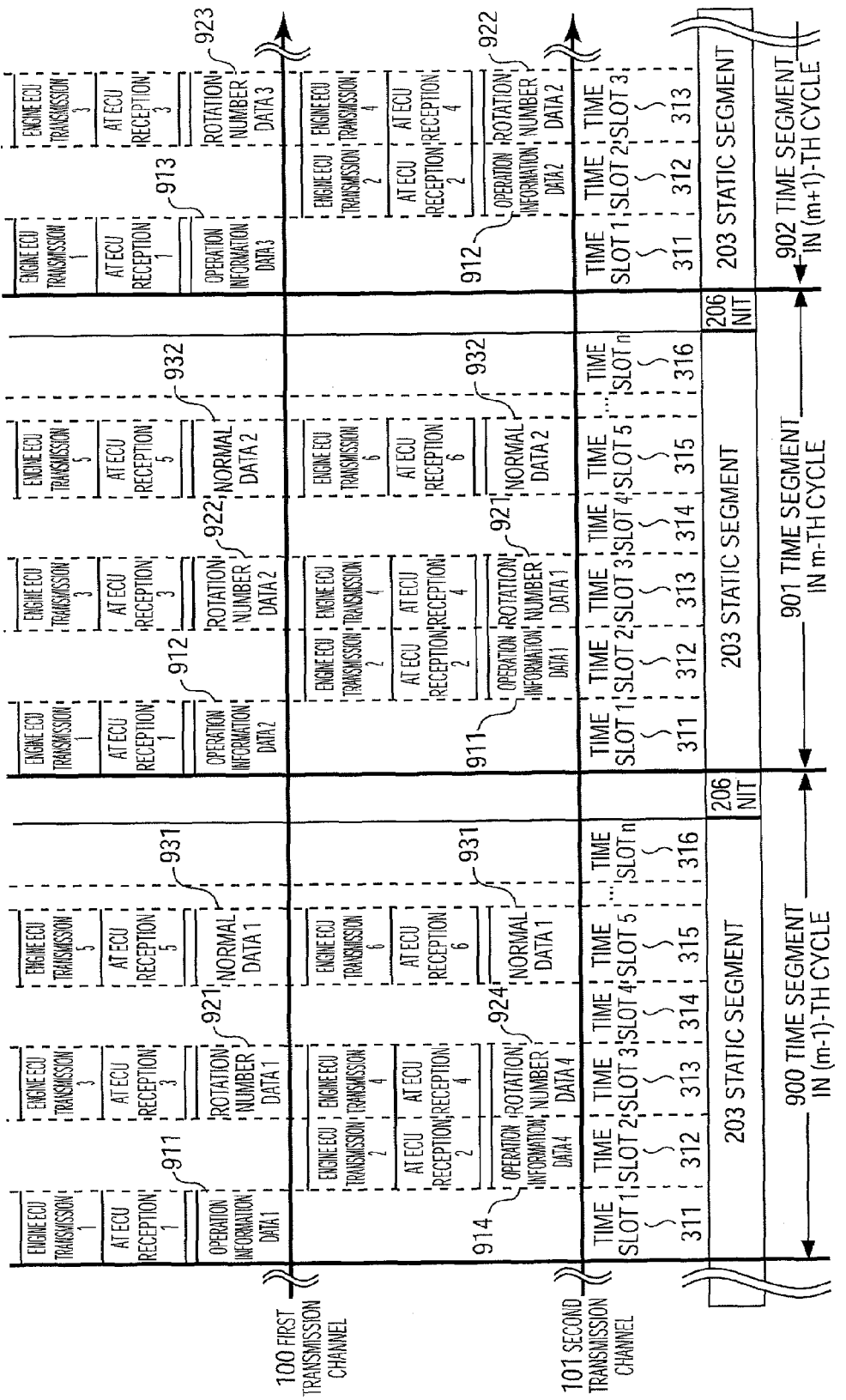
FIG. 9 is a communication configuration view showing the settings of transmission and reception time slots in the time division multiple access communication network system of the third embodiment.

Referring to FIG. 9, Numerals 900, 901, and 902 denote time segments and each is formed of a static segment (203) and an NIT (206).

The static segment (203) is formed of a time slot 1 through a time slot n.

Numeral 900 denotes a time segment in an (m−1)-th cycle. Numeral 901 denotes a time segment in an m-th cycle. Numeral 902 denotes a time segment in an (m+1)-th cycle. These segments are common in the first transmission channel (100) and the second transmission channel (101).

The communication configuration in the time division multiple access communication network system of this embodiment in accordance with the FlexRay communication will now be described with reference to FIG. 9.

In the time division multiple access communication network system of this embodiment, as is shown in FIG. 9, set in advance in the engine ECU (801) are "transmission 1" in the time slot 1 (311), "transmission 3" in the time slot 3 (313), and "transmission 5" in the time slot 5 (315) on the first transmission channel (100) as well as "transmission 2" in the time slot 2 (312), "transmission 4" in the time slot 3 (313), and "transmission 6" in the time slot 5 (315) on the second transmission channel (101).

Also, set in advance in the AT ECU (802) are "reception 1" in the time slot 1 (311), "reception 3" in the time slot 3 (313), and "reception 5" in the time slot 5 (315) on the first transmission channel (100) as well as "reception 2" in the time slot 2 (312), "reception 4" in the time slot 3 (313), and "reception 6" in the time slot 5 (315) on the second transmission channel (101).

Herein, Numerals 911 through 914 denote operation information (driver behavior) data relevant to operations by the driver and held in the engine ECU (801) in the network system of this embodiment, and it is crucial data transmitted to and received from the AT ECU (802).

Also, Numerals 921 through 924 denote data about the engine rotation number (engine speed) relevant to behaviors of the vehicle and held in the engine ECU (801) in the network system of this embodiment, and it is crucial data transmitted to and received from the AT ECU (802).

The operation information (driver behavior) data 1 (911) and the rotation number (engine speed) data 1 (921) are transmitted within the time segment (900) in the (m−1)-th cycle, respectively, by "transmission 1" in the time slot 1 (311) and "transmission 3" in the time slot 3 (313) set in the engine ECU (801) on the first transmission channel (100) and received at the AT ECU (802) by "reception 1" and "reception 3", respectively.

Meanwhile, the operation information (driver behavior) data 1 (911) and the rotation number (engine speed) data 1 (921) are transmitted again, respectively, by "transmission 2" in the time slot 2 (312) and "transmission 4" in the time slot 3 (313) set in the engine ECU (801) on the second transmission channel (101) and received again at the AT ECU (802), respectively, by "reception 2" and "reception 4", within the time segment (901) in the m-th cycle, which is the next time segment following the time segment (900) in the (m−1)-th cycle.

In this manner, it is set in advance in such a manner that after the operation information (driver behavior) data 1 (911) and the rotation number (engine speed) data 1 (921) are transmitted and received in the corresponding transmission and reception time slots on the first transmission channel (100) within the time segment (900) in the (m−1)-th cycle, they are transmitted and received again also on the second transmission channel (101), which is the other transmission channel, in the corresponding transmission and reception time slots within the time segment (901) in the m-th cycle, which is the next time segment.

The same can be said with the operation information (driver behavior) data 2 (912), the operation information (driver behavior) data 3 (913), the operation information (driver behavior) data 4 (914), the rotation number (engine speed) data 2 (922), the rotation number (engine speed) data 3 (923), and the rotation number (engine speed) data 4 (924). That is to say, it is set in advance in such a manner that after they are transmitted and received in the corresponding transmission and reception time slots on one transmission channel, they are transmitted and received again in the next transmission and reception time slots on the other transmission channel.

Although it is not shown in the drawing, it should be noted that after the operation information (driver behavior) data 3 (913) and the rotation number (engine speed) data 3 (923) are transmitted and received in the corresponding time slots on the first transmission channel (100) within the time segment (902) in the (m+1)-th cycle, they are transmitted and received also in the corresponding time slots on the second transmission channel (101) within the next time segment.

Also, although it is not shown in the drawing, either, it should be noted that after the operation information (driver behavior) data 4 (914) and the rotation number (engine speed) data 4 (924) are transmitted and received in the corresponding time slots on the first transmission channel (100) within the time segment next preceding the time segment (900) in the (m−1)-th cycle, they are transmitted and received, respectively, in the time slot 2 (312) and the time slot 3 (313) on the second transmission channel (101) within the time segment (900) in the (m−1)-th cycle, which is the next following time segment.

Meanwhile, Numerals 931 and 932 denote normal data to be transmitted and received in the network of this embodiment.

Within the time segment (900) in the (m−1)-th cycle, the engine ECU (801) transmits the normal data 1 (931) by "transmission 5" in the time slot 5 (315) on the first transmission channel (100) and by "transmission 6" in the time slot 5 (315) on the second transmission channel (101) and the AT ECU (802) receives the same data by "reception 5" on the first transmission channel (100) and by "reception 6" on the second transmission channel (101).

Also, within the time segment (901) in the m-th cycle, the engine ECU (801) transmits the normal data 2 (932) by "transmission 5" in the time slot 5 (315) on the first transmission channel (100) and by "transmission 6" in the time slot 5 (315) on the second transmission channel (101) and the AT ECU (802) receives the same data by "reception 5" on the first transmission channel (100) and by "reception 6" on the second transmission channel (101).

In this manner, it is set in advance for the normal data so that the same data is transmitted on the first transmission channel (100) and the second transmission channel (101).

Operations in a normal state of the time division multiple access communication network system via a plurality of transmission channels having the node configuration as shown in FIG. 8 and the communication configuration as shown in FIG. 9 will now be described.

The engine ECU (801) transmits the operation information (driver behavior) data 2 (912) within the time segment (901) in the m-th cycle by "transmission 1" in the time slot 1 (311) on the first transmission channel (100) and the AT ECU (802) receives the operation information (driver behavior) data 2 (912) by "reception 1" in the time slot 1 (311).

Subsequently, the engine ECU (801) transmits the operation information (driver behavior) data 1 (911) by "transmission 2" in the time slot 2 (312) on the second transmission channel (101) and the AT ECU (802) receives the operation information (driver behavior) data 1 (911) by "reception 2" in the time slot 2 (312).

Herein, the operation information (driver behavior) data 1 (911) to be transmitted by "transmission 2" from the engine ECU (801) is the same as the operation information (driver behavior) data 1 (911) that has been transmitted by "transmission 1" on the first transmission channel (100), which is the other transmission channel, within the time segment (900) in the (m−1)-th cycle, which is the next preceding time segment.

Further, the engine ECU (801) transmits the rotation number (engine speed) data 2 (922) by "transmission 3" in the time slot 3 (313) on the first transmission channel (100) and the AT ECU (802) receives the rotation number (engine speed) dare 2 (922) by "reception 3" in the time slot 3 (313).

Subsequently, the engine ECU (801) transmits the rotation number (engine speed) data 1 (921) by "transmission 4" in the time slot 3 (313) on the second transmission channel (101) and the AT ECU (802) receives the rotation number (engine speed) data 1 (921) by "reception 4" in the time slot 3 (313).

Herein, the rotation number (engine speed) data 1 (921) to be transmitted by "transmission 4" from the engine ECU (801) is the same as the rotation number (engine speed) data 1 (921) that has been transmitted by "transmission 3" on the first transmission channel (100), which is the other transmission channel, within the time segment (900) in the (m−1)-th cycle, which is the next preceding time segment.

Subsequently, the engine ECU (801) transmits the normal data 2 (932) by "transmission 5" in the time slot 5 (315) on the first transmission channel (100) and the AT ECU (802) receives the normal data 2 (932) by "reception 5" in the time slot 5 (315).

Further, the engine ECU (801) transmits the normal data 2 (932) again by "transmission 5" in the time slot 5 (315) on the second transmission channel (101) and the AT ECU (802) receives the normal data 2 (932) again by "reception 5" in the time slot 5 (315).

While the transmission and reception operations within the time segment (901) in the m-th cycle alone have been described, it should be appreciated that regarding the operation information (driver behavior) data and the rotation number (engine speed) data, the engine ECU (801) transmits the operation information (driver behavior) data and the rotation number data same as the operation information (driver behavior) data and the rotation number (engine speed) data that have been transmitted on the first transmission channel (100) in the corresponding time slots set for transmission of the operation information (driver behavior) data and the rotation number (engine speed) data on the second transmission channel (101), and regarding the normal data, it always transmits the same data to the first transmission channel (100) and the second transmission channel (101) in the same manner as above within the next time segment (902) in the (m+1)-th cycle and the following time segments, too.

Also, regarding the rotation information data and the rotation number (engine speed) data, the AT ECU (802) receives the operation information (driver behavior) data and the rotation number (engine speed) data same as the rotation information data and the rotation number (engine speed) data that have been received on the first transmission channel (100) in the time slots in which to receive the operation information (driver behavior) data and the rotational number data on the second transmission channel (101), and regarding the normal data, it always receives the same data on the first transmission channel (100) and the second transmission channel (101) within the next and later time segments.

The settings of the transmission and reception time slots on each transmission channel and for each node as described above are made in advance before communications are started in common among the nodes connected to the network.

Operations of the time division multiple access communication network system via a plurality of transmission channels of this embodiment at the occurrence of a temporal trouble on a plurality of the transmission channels in the same place at the same time will now be described with reference to FIG. 10.

Assume that a noise is applied to the first transmission channel (100) and the second transmission channel (101) in the same place at the same time.

Figure 10:
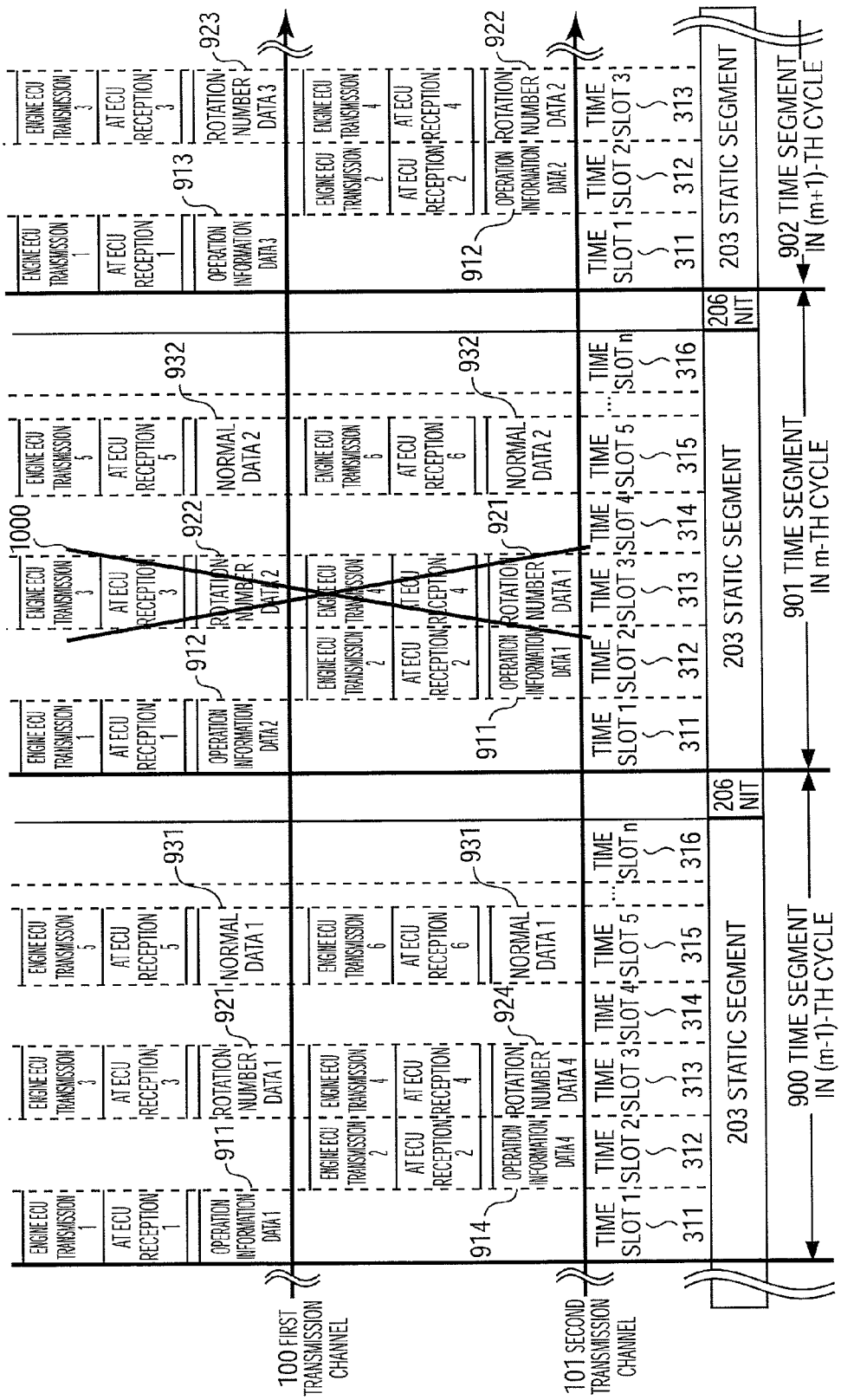
FIG. 10 is a view used to describe operations of the time division multiple access communication network system of the third embodiment at the occurrence of a trouble.
Figure 11:
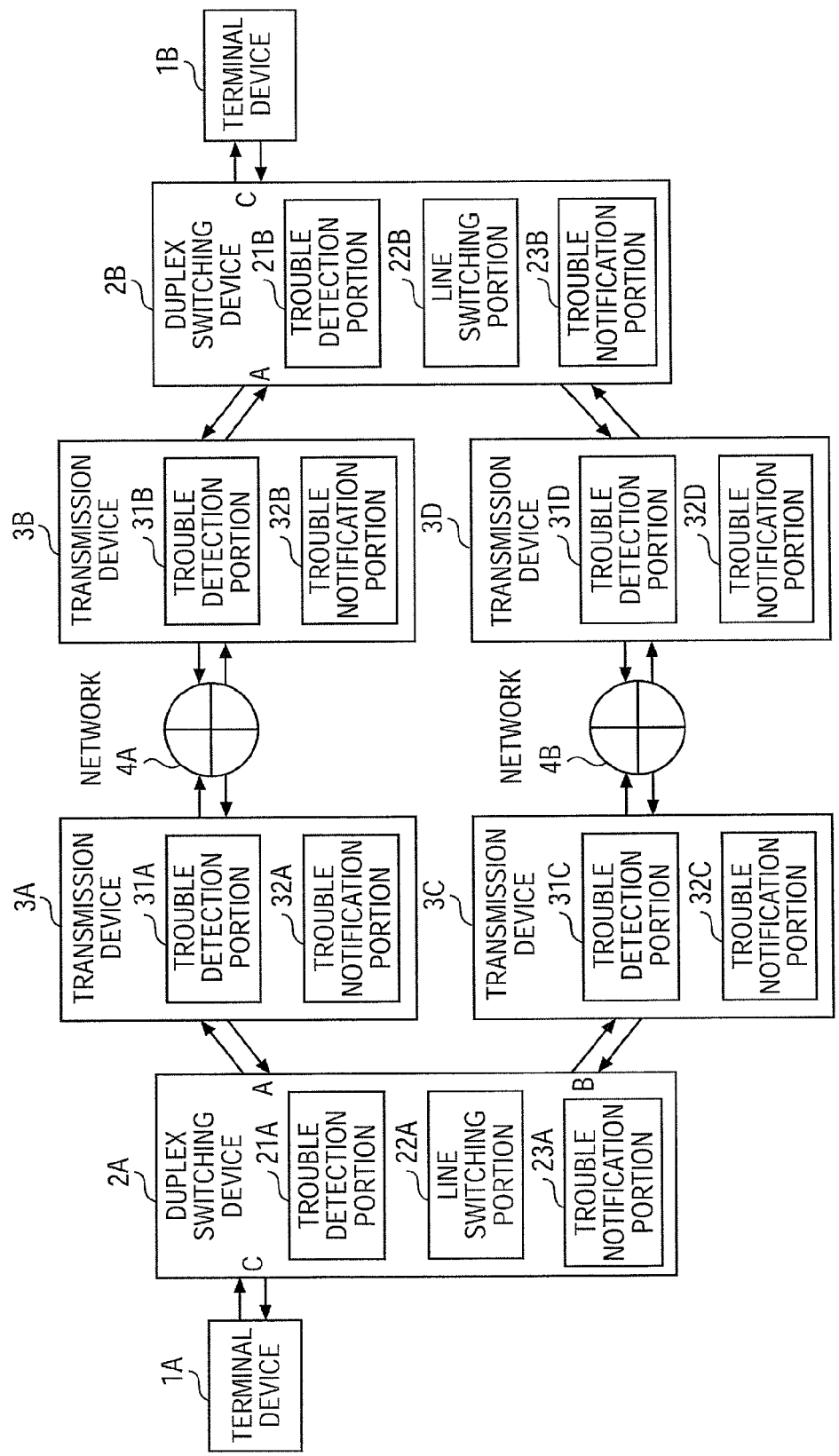
FIG. 11 is a view showing the configuration of a duplex network in the related art.
Figure 12:
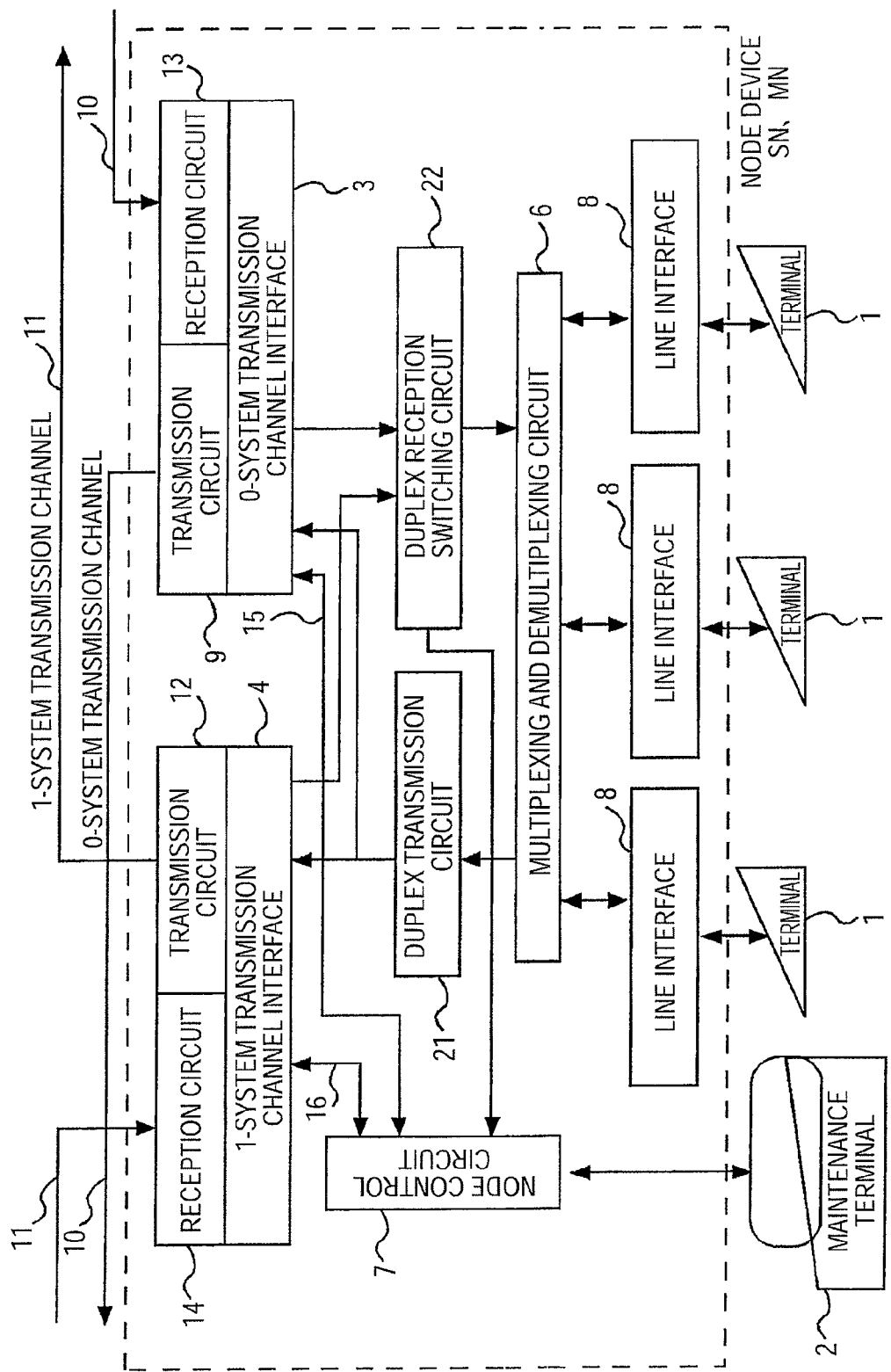
FIG. 12 is a view showing the configuration of another duplex network in the related art.
Figure 13:
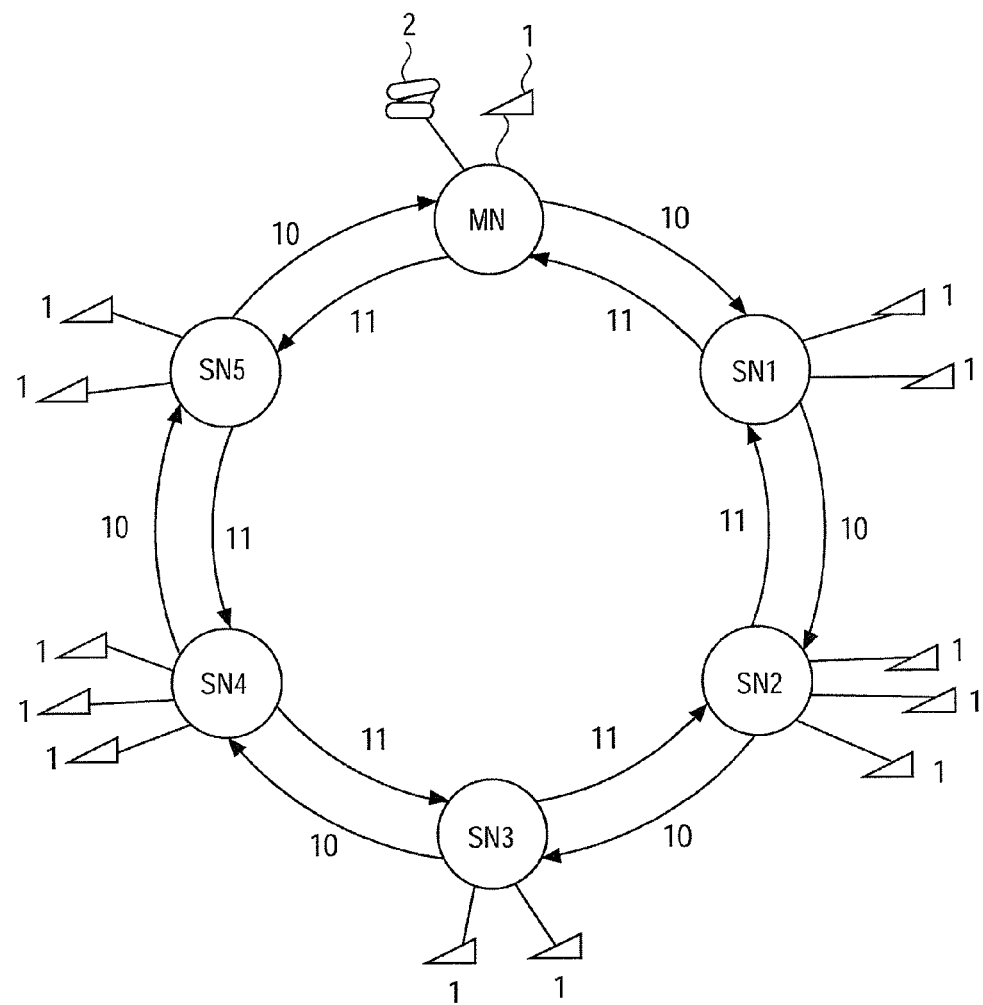
FIG. 13 is a view showing the configuration of a ring-type network to which the duplex network in the related art is applied.
Figure 14:
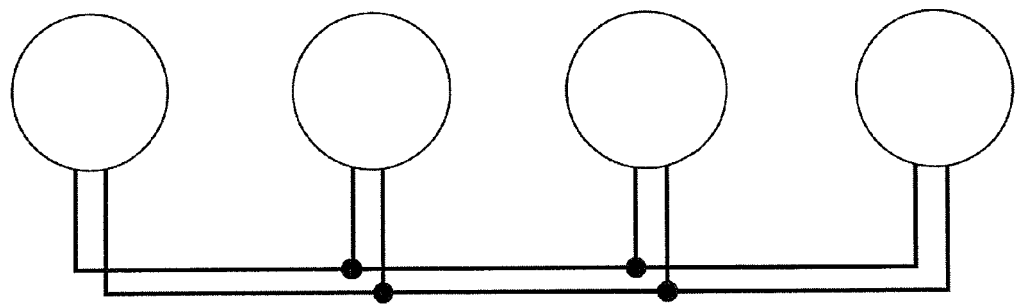
FIG. 14 is a view showing the configuration of a bus-type network.

Consequently, as is shown in FIG. 10, a noise (1000) is applied to the time slot 3 (313) within the time segment (901) in the m-th cycle and the rotation number (engine speed) data 2 (922) being transmitted on the first transmission channel (100) and the rotation number (engine speed) data 1 (921) being transmitted on the second transmission channel (101) are damaged.

In the time division multiple access communication network system of this embodiment, however, it is set in advance in such a manner that the rotational number data 2 (922), which was supposed to be transmitted and received by "transmission 3" within the time segment (901) in the m-th cycle on the first transmission channel (100) and is now damaged by the noise (1000), is transmitted intact from the engine ECU (801) by "transmission 4" in the time slot 3 (313) within the time segment (902) in the (m+1)-th cycle, which is the next transmission timing of the failure information data on the second transmission channel (101). The AT ECU (802) is thus able to receive the rotation number (engine speed) data 2 (922) by "reception 4" in the same time slot, that is, the time slot 3 (313).

Meanwhile, the rotation number (engine speed) data 1 (921) damaged by the noise (1000) had been already transmitted from the engine ECU (801) by "transmission 3" in the time slot 3 (313) within the time segment (900) in the (m−1)-th cycle, which is the next preceding time segment, on the first transmission channel (100) and had been received at the AT ECU (802) by "reception 3" in the same time slot, that is, the time slot 3 (313). The rotation number (engine speed) data 1 (921) is therefore unsusceptible to data damage by the noise (1000).

As has been described, even in a case where crucial data, such as the rotation number of the engine relevant to behaviors of the vehicle and operation information (driver behavior) relevant to the operation by the driver, is damaged at the occurrence of a temporal trouble caused by a noise or the like on a plurality of transmission channels in the same place at the same time, it is possible to transmit and receive the intact data in the next preceding and following transmission and reception time slots on the other transmission channel without having to perform a special switching after the noise detection.

Also, even in a case where crucial data, such as the rotation number of the engine relevant to behaviors of the vehicle and operation information (driver behavior) relevant to the operation by the driver, is damaged at the occurrence of a temporal trouble caused by a noise or the like on a plurality of transmission channels in the same place at the same time, it is possible to transmit and receive the intact data in the next preceding and following transmission and reception time slots on the other transmission channel without interfering with any other communication.

By defining the rotation number of the engine relevant to behavior of the vehicle as the crucial data as in this embodiment, no data relevant to behaviors of the vehicle will be dropped even at the occurrence of a trouble, such as a noise. It thus becomes possible to control the vehicle more precisely owing to continuous information reception.

Also, by defining information relevant to operations by the driver as the crucial data as in this embodiment, no data relevant to the operation by the driver will be dropped even at the occurrence of a trouble, such as a noise. It thus becomes possible to control the vehicle more elaborately by reflecting the operation by the driver owing to continuous information reception.

Further, data relevant to behaviors of the vehicle is not limited to information about the engine rotation number (engine speed) and information relevant to the operation by the driver is not limited to the operation information (driver behavior), either.

Also, the same advantages can be achieved by defining information relevant to the safety of the vehicle as the crucial data or by selecting the crucial data according to the system used or by defining all the data as the crucial data.

Regarding the information relevant to the safety of the vehicle, unintended dropping of data caused by the damage of data at the occurrence of a temporal trouble is by no means acceptable because this dropping is highly likely to result in an accident.

In view of the forgoing, the capability of the invention to ensure the reception of information relevant to the safety of the vehicle provides significant advantages.

In the first and second embodiments above, in order to describe the advantages of the invention, descriptions have been given limitedly to a case where the node A (102) alone transmits data and a case where the node B (103) alone receives the data. It should be appreciated, however, that which node transmits and receives data does not give influences to the advantages of the invention in the actual network.

In the third embodiment above, in order to describe the advantages of the invention, descriptions have been given limitedly to a case where the engine ECU (801) alone transmits data and a case where the AT ECU (802) alone receives data. It should be appreciated, however, that which node transmits and receives data does not give influences to the advantages of the invention in the actual network.

Also, the first through third embodiments have described transmission and reception between two nodes alone. It should be appreciated, however, that the same advantages can be achieved even when the number of nodes is increased to three, four, and so on.

Meanwhile, the FlexRay communication is used as the transmission channels in the first through third embodiments above. It should be appreciated, however, that the transmission channels are not limited to this configuration as long as it is a communication protocol according to the time division multiple access communication network system.

As has been described, according to the time division multiple access communication network system of this embodiment, in the first embodiment above, the first transmission time slot on the first transmission channel and the second transmission time slot determined from the transmission time slots on the second transmission channel within a time segment in a next cycle are set in advance in the transmitter node.

Hence, according to this embodiment, when data is transmitted on one transmission channel, it is possible to transmit the same data also on another transmission channel in a transmission time slot within the time segment in the next cycle. Consequently, even in a case where a temporal trouble occurs on a plurality of transmission channels in the same place at the same time, the receiver node is able to receive the same transmission data in a reliable manner after the occurrence of a temporal trouble within the time segment in the next cycle on a transmission channel other than the transmission channel on which the data has been damaged by the trouble.

Also, according to this embodiment, the time division multiple access communication network system is used for a vehicle, and the first transmission time slot on the first transmission channel and the second transmission time slot on the second transmission channel are set in advance in the transmitter node for transmission of data relevant to an operation on the vehicle.

Hence, according to this embodiment, regarding the data relevant to operations by the user and transmitted on one transmission channel, it is possible to transmit the same data also on another transmission channel in a different transmission time slot. Consequently, even in a case where a temporal trouble occurs on a plurality of transmission channels in the same place at the same time, the receiver node is able to receive the crucial transmission data relevant to the operation by the user in a reliable manner on a transmission channel other than the transmission channel on which the transmission data has been damaged by the trouble.

Also, according to this embodiment, the time division multiple access communication network system is used for a vehicle, and the first transmission time slot on the first transmission channel and the second transmission time slot on the second transmission channel are set in advance in the transmitter node for transmission of data relevant to a behavior of the vehicle.

Hence, according to this embodiment, regarding the data relevant to behaviors of a vehicle and transmitted on one transmission channel, it is possible to transmit the same data also on another transmission channel in a different transmission time slot. Consequently, even in a case where a temporal trouble occurs on a plurality of transmission channels in the same place at the same time, the receiver node is able to receive the crucial transmission data relevant to behaviors of the vehicle in a reliable manner on a transmission channel other than the transmission channel on which the transmission data has been damaged by the trouble.

According to this embodiment, the time division multiple access communication network system is used for a vehicle, and the first transmission time slot on the first transmission channel and the second transmission time slot on the second transmission channel are set in advance in the transmitter node for transmission of data relevant to safety of the vehicle.

Hence, according to this embodiment, regarding the data relevant to the safety of the vehicle and transmitted on one transmission channel, it is possible to transmit the same data also on another transmission channel in a different transmission time slot. Consequently, even in a case where a temporal trouble occurs on a plurality of transmission channels in the same place the same time, the receiver node is able to receive the crucial transmission data relevant to the safety of the vehicle in a reliable manner on a transmission channel other than the transmission channel on which the transmission data has been damaged by the trouble.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A time division multiple access communication network system in which a plurality of nodes each furnished with a communication capability are interconnected via a plurality of transmission channels, time slots of a same length are present on the plurality of transmission channels, the time slots used for data transmission and reception by the nodes are set in advance on each transmission channel, and the data transmission and reception among the nodes is performed by repeating a time segment which is a set of the time slots, in a cycle common to the plurality of transmission channels, the time division multiple access communication network system comprising:
   a transmitter node configured to transmit data; and
   a receiver node configured to receive the data,
   wherein the transmitter node includes:
      a first data transmission unit using a first transmission time slot to transmit first data within the time segment in one cycle and configured to transmit the first data in the first transmission time slot on a first transmission channel; and
      a second data transmission unit configured to transmit the first data transmitted by the first data transmission unit in a second transmission time slot, determined in advance, on a second transmission channel so as not to superimpose in time on the first transmission time slot, and
   wherein the receiver node includes:
      a first data reception unit using a first reception time slot to receive the first data within the time segment in one cycle and configured to receive the first data transmitted by the transmitter node in a first reception time slot, determined in advance, on the first transmission channel so as to superimpose in time on the first transmission time slot on the first transmission channel; and
      a second data reception unit configured to receive the first data transmitted by the second data transmission unit in a second reception time slot, determined in advance, on the second transmission channel so as to superimpose in time on the second transmission time slot.

2. The time division multiple access communication network system according to claim 1, wherein:
   the second transmission time slot determined from the transmission time slots on the second transmission channel within a time segment in a cycle same as the cycle of the first transmission time slot on the first transmission channel is set in advance in the transmitter node.

3. The time division multiple access communication network system according to claim 1, wherein:
   the first transmission time slot on the first transmission channel and the second transmission time slot on the second transmission channel are set in advance in the transmitter node for all data to be transmitted by the transmitter node.

4. The time division multiple access communication network system according to claim 1, wherein:
   a transmission time slot on the second transmission channel after the first transmission time slot on the first transmission channel is set in advance in the transmitter node as the second transmission time slot.

5. The time division multiple access communication network system according to claim 1, wherein:
   the first transmission time slot on the first transmission channel and the second transmission time slot on the second transmission channel are set in advance in the transmitter node for transmission of data having a short transmission period.

6. The time division multiple access communication network system according to claim 1, wherein:
   the first transmission time slot on the first transmission channel and the second transmission time slot on the second transmission channel are set in advance in the transmitter node for transmission of data having a long transmission period.

7. The time division multiple access communication network system according to claim 1, wherein:
   the first transmission time slot on the first transmission channel and the second transmission time slot on the second transmission channel are set in advance in the transmitter node for transmission of data relevant to a failure of its own.

8. The time division multiple access communication network system according to claim 1, wherein:
   the first transmission time slot on the first transmission channel and the second transmission time slot determined from the transmission time slots on the second transmission channel within a time segment in a next cycle are set in advance in the transmitter node.

9. The time division multiple access communication network system according to claim 1, wherein:
   the time division multiple access communication network system is used for a vehicle; and
   the first transmission time slot on the first transmission channel and the second transmission time slot on the second transmission channel are set in advance in the transmitter node for transmission of data relevant to an operation on the vehicle.

10. The time division multiple access communication network system according to claim 1, wherein:

the time division multiple access communication network system is used for a vehicle; and the first transmission time slot on the first transmission channel and the second transmission time slot on the second transmission channel are set in advance in the transmitter node for transmission of data relevant to a behavior of the vehicle.

11. The time division multiple access communication network system according to claim 1, wherein:

the time division multiple access communication network system is used for a vehicle; and the first transmission time slot on the first transmission channel and the second transmission time slot on the second transmission channel are set in advance in the transmitter node for transmission of data relevant to safety of the vehicle.

12. The time division multiple access communication network system according to claim 1, wherein the first data transmission unit is configured to transmit second data, different from the first data, in the first transmission time slot on the second transmission channel, and the first data reception unit is configured to receive the second data in the first reception time slot.

* * * * *